US012791531B2

(12) United States Patent
Steinmeyer

(10) Patent No.: US 12,791,531 B2
(45) Date of Patent: Nov. 10, 2026

(54) METHOD AND SYSTEM FOR DETERMINING AN ACOUSTIC POWER OF AN ULTRASONIC EMITTER

(71) Applicant: Technische Hochschule Nürnberg Georg Simon Ohm, Nuremberg (DE)

(72) Inventor: Florian Steinmeyer, Herzogenaurach (DE)

(73) Assignee: Technische Hochschule Nürnberg Georg Simon Ohm, Nuremberg (DE)

( * ) Notice: Subject to any disclaimer, the term of this patent is extended or adjusted under 35 U.S.C. 154(b) by 326 days.

(21) Appl. No.: 18/552,682

(22) PCT Filed: Apr. 1, 2022

(86) PCT No.: PCT/EP2022/058778

§ 371 (c)(1),
(2) Date: Sep. 27, 2023

(87) PCT Pub. No.: WO2022/214403

PCT Pub. Date: Oct. 13, 2022

(65) Prior Publication Data

US 2024/0369705 A1 Nov. 7, 2024

(30) Foreign Application Priority Data

Apr. 7, 2021 (EP) .................................... 21167188

(51) Int. Cl.
*G01N 29/44* (2006.01)
*G01N 29/22* (2006.01)
(Continued)

(52) U.S. Cl.
CPC ....... *G01N 29/4454* (2013.01); *G01N 29/221* (2013.01); *G01N 29/30* (2013.01);
(Continued)

(58) Field of Classification Search
CPC .. G01N 29/4454; G01N 29/221; G01N 29/30; G01N 29/223; G01N 29/26;
(Continued)

(56) References Cited

U.S. PATENT DOCUMENTS 4,463,608 A 8/1984 Takeuchi et al.
5,463,593 A 10/1995 Zanelli et al.
8,215,152 B2 7/2012 Kim

FOREIGN PATENT DOCUMENTS

WO WO-2021154977 A1 * 8/2021 ............ G01N 21/05

OTHER PUBLICATIONS

International Search Report and Written Opinion from corresponding PCT Appln. No. PCT/EP2022/058778, dated Jul. 26, 2022. 19 pages.

(Continued)

*Primary Examiner* — Benjamin R Schmitt
(74) *Attorney, Agent, or Firm* — Secant IP, PLLC

(57) ABSTRACT

A method for determining an acoustic power of an ultrasonic emitter comprises coupling the ultrasonic emitter to a test medium, driving the ultrasonic emitter to induce acoustic waves in the test medium along an acoustic wave propagation direction, the acoustic waves causing a change of the refractive index of the test medium, selectively irradiating a probe portion of the test medium with a collimated beam of light along a beam direction which is different from the acoustic wave propagation direction, such that the collimated beam of light intersects the acoustic waves, passing the collimated beam of light through an optical element or optical assembly configured for focusing the collimated beam in a focal plane, and determining the acoustic power of the ultrasonic emitter based on a refraction-induced width of a light intensity distribution in the focal plane.

19 Claims, 9 Drawing Sheets

(51) Int. Cl.

| | |
|---|---|
| ***G01N 29/30*** | (2006.01) |
| ***G01S 7/52*** | (2006.01) |
| ***G01S 15/86*** | (2020.01) |
| ***G01S 15/89*** | (2006.01) |
| *G01N 29/26* | (2006.01) |
| *G01N 29/46* | (2006.01) |

(52) U.S. Cl.
CPC ...... *G01S 7/52004* (2013.01); *G01S 7/52079* (2013.01); *G01S 15/86* (2020.01); *G01S 15/8965* (2013.01); *G01N 29/223* (2013.01); *G01N 29/26* (2013.01); *G01N 29/46* (2013.01)

(58) Field of Classification Search
CPC .... G01N 29/44; G01N 29/46; G01S 7/52004; G01S 7/52079; G01S 15/86; G01S 15/8965
See application file for complete search history.

(56) References Cited

OTHER PUBLICATIONS

Dunlap, M.D., et al., "Ultrasound Beam Characterization through Real Time Visualization with Schlieren Imaging", 2020 IEEE International Ultrasonics Symposium (IUS), IEEE, Sep. 7, 2020, pp. 1-4, retrieved Nov. 6, 2020, Charlotte, NC.
Xu, Zheng et al., "Quantitative Calibration of Sound Pressure in Ultrasonic Standing Waves using the Schlieren Method", Optics Express, vol. 25, No. 17, Aug. 14, 2017, pp. 20401-20409, Shanghai, China.
Harigane et al., "Optical Phase Contrast Mapping of Highly Focused Ultrasonic Fields", Japanese Journal of Applied Physics, vol. 52, 2013, Japan, pp. 1-5.
Kuroyama et al., "Optical measurement of instantaneous ultrasound field containing light scatterers based on laser deflection method", Japanese Journal of Applied Physics, vol. 57, 2018, Japan, pp. 1-3.
Omura et al., "Quantitative Measurement of Focused Ultrasound Pressure Field Using Subtraction Shadowgraph", Japanese Journal of Applied Physics, vol. 50, 2011, Japan, pp. 1-3.
Oyama et al., "Quantitative measurement of ultrasound pressure field by optical phase contrast method and acoustic holography", Japanese Journal of Applied Physics, vol. 55, 2016, Japan, pp. 1-6.
Settles, "Schlieren and Shadowgraph Techniques Visualizing Phenomena in Transparent Media", 2001, New York, pp. 1-387 (submitted as part 1 and 2).
Shimazaki et al., "Three-Dimensional Quantitative Optical Measurement of Asymmetrically Focused Ultrasound Pressure Field", Japanese Journal of Applied Physics, vol. 51, 2012, Japan, pp. 1-4.
Unverzagt et al., "A new method of spatial filtering for Schlieren visualization of ultrasound wave fields", Physics Procedia, vol. 3, 2010, Germany, pp. 935-942.

* cited by examiner

METHOD AND SYSTEM FOR DETERMINING AN ACOUSTIC POWER OF AN ULTRASONIC EMITTER

FIELD OF THE INVENTION

The present invention is in the field of ultrasonic emitter calibration. More precisely, the present invention relates to an optical method for determining the acoustic power of an ultrasonic emitter.

BACKGROUND

Ultrasound technology is widely used in various scientific fields such as chemistry, biology, and in industry. Moreover, ultrasound can be used in diagnostic as well as therapeutic applications in medicine. In most of these applications, it is important to know the acoustic power of the ultrasonic emitter to use the ultrasonic emitter safely and effectively.

For example, in therapeutic applications, the dose of the acoustic power applied can be critical for the success of the treatment. In diagnostic applications, an inadvertently high power can exceed clinical power limits for a diagnostic procedure while an inadvertently low power can result in reduced contrast. In both cases it would be optimal to measure the acoustic power of the ultrasonic emitter as part of a regular quality control of the device.

One way to determine the acoustic power in the emission field of an ultrasonic emitter is to probe the acoustic field with a hydrophone. A hydrophone is a small piezo-electric sensor that can measure a local sound pressure in a liquid medium. The distribution of the acoustic field of an ultrasonic emitter can be mapped by three-dimensionally screening of the liquid medium with the hydrophone while driving the ultrasonic emitter. However, this process is not only time consuming, but the sensor can also be destroyed if it encounters a region of large acoustic power density, such as in the focus of an ultrasonic emitter. Moreover, the measured and the real acoustic pressure distribution can differ if the sound-wavelength is comparable in size to or smaller than the hydrophone.

Alternatively, the acoustic power can be accurately determined with a radiation-force balance which integrates the net radiation pressure through its effect on an acoustic absorber in aliquid container. Unfortunately, the measurement result is easily influenced by ambient vibrations and only valid above a certain minimum acoustic power level. Moreover, at high power levels, the acoustic absorber can expand and therefore feature a varying buoyancy over time, thereby limiting the maximum power that can be measured with the radiation-force balance.

It is also known that the acoustic field in a medium can be visualized in the so called "Schlieren" method, wherein the acousto-optic effect of the sound waves on a test medium is exploited in an optical setup to optically distinguish regions subjected to the acoustic waves from regions free from acoustic waves.

Xu et al ("*Quantitative calibration of sound pressure in ultrasonic standing waves using the Schlieren method*", Optics Express, Vol. 25, No. 17, 2017) discloses an optical method for calibrating high-frequency ultrasonic standing-wave fields at low acoustic power. The method comprises inducing a standing wave of acoustic waves in a water bath and irradiating the acoustic wave pattern with a laser. As a result of the acousto-optic effect, the light is phase modulated resulting in a diffraction pattern of regularly spaced light fringes in the Fourier plane of a lens disposed behind the bath. The intensity of the light fringes of the diffraction pattern is measured and, based on a relative magnitude of the light intensities, a conclusion is drawn on the acoustic power of the standing waves inducing the phase modulation of the light.

SUMMARY OF THE INVENTION

However, the known methods can hardly be practically implemented in regular quality control or are associated with technical shortcomings outside of a narrow parameter range not covering various cases of interest. The traditional methods of calibrating the acoustic power with hydrophones or radiation-force balances are lengthy and cumbersome. On the other hand, most optical methods require both setup calibration and result analysis by skilled personnel, and are often only applicable in certain acoustic power regimes or used for specific ultrasonic emitter configurations, e.g. for plane standing waves.

In view of this state-of-the-art, the object of the invention is to provide an improved method for determining the acoustic power of an ultrasonic emitter with simple steps and which is applicable also in regimes of large acoustic power, which may feature non-linearly deformed acoustic (shock) waves that would often destroy hydrophone sensors, but have relevant applications in practice e.g. for extracorporeal shockwave therapy of kidney stones.

This object is solved by a method and a system according to the independent claims. The dependent claims relate to preferred embodiments.

According to a first aspect, the invention relates to a method for determining an acoustic power of an ultrasonic emitter. The method comprises coupling the ultrasonic emitter to a test medium and driving the ultrasonic emitter to induce acoustic waves in the test medium along an acoustic wave propagation direction, the acoustic waves causing a change of the refractive index of the test medium. The method further comprises selectively irradiating a probe portion of the test medium with a collimated beam of light along a beam direction which is different from the acoustic wave propagation direction, such that the collimated beam of light intersects the acoustic waves, and passing the collimated beam of light through an optical element or optical assembly configured for focusing the collimated beam in a focal plane. The method further comprises determining the acoustic power of the ultrasonic emitter based on a refraction-induced width of a light intensity distribution in the focal plane.

Note that in absence of any variation of the refractive index due to an acoustic wave, the collimated light beam would be focused in a focal point in the focal plane, and the width of the light intensity distribution would be zero or at least very small. The inventor realized that by measuring the light intensity distribution in the focal plane of the optical element or optical assembly, the deflection angle arising due to a refractive index change of the test medium can be experimentally accessed directly. The magnitude of the refractive index change depends on the local pressure in the test medium due to acousto-optic effects, and can therefore be related to the acoustic power of the ultrasonic emitter. Specifically, the inventor found that the light intensity distribution in the focal plane effectively corresponds to an integral over the deflection angles of the collimated beam of light in the probe portion, and established that the "spread" or "width" of the light intensity distribution can be a quantitative measure of the acoustic power in the test medium.

Accordingly, the method of the invention involves determining the width of the light intensity distribution and inferring the acoustic power therefrom, as opposed to a measure of a luminosity or the relative intensities of individual fringes in a diffraction pattern, as performed in the prior art.

There are various ways of quantitative evaluation of the width of the light intensity distribution. In experiments, the inventor could confirm that e.g. the variance of the light intensity distribution, as one possible quantitative evaluation of the width of the light intensity distribution, depends linearly on the acoustic power of the ultrasonic emitter in a comparatively wide parameter range. However, there are other mathematical quantities that likewise allow for capturing the phenomenological "spread" or "width" of the light intensity distribution in the focal plane due to refraction caused by the variation of refractive index induced by the acoustic power in a quantitative manner, and the invention is not limited to any specific one of them. Further possible examples of quantities representing the refraction-induced width of the light intensity distribution in the focal plane are known from statistical mathematics, e.g. second central moment evaluation and a number of similar procedures for discrete and continuous variables, sometimes abbreviated as ANOVA (Analysis of Variance and Covariance), e.g. in the Matlab™ toolbox. Also, any of the mathematical quantities for quantifying the refraction induced width of the light intensity distribution, such as the variance, could be taken over a portion of an image of the focal plane, such as a half plane or a quarter plane of the focal plane (with half and quarter referring e.g. to the left/right or upper/lower half planes with respect to the origin, or quadrants around the origin).

Moreover, calculations of the inventor show that a mathematical relation between acoustic power and the width, and in particular the variance of the light intensity distribution can be surprisingly simple in a practically relevant regime of acoustic power.

Due to this simplicity, the method can be used to rapidly perform a quantitative assessment of the acoustic power of an ultrasonic emitter with an experimentally as well as numerically simple and robust process.

The collimated beam of light may be generated directly, e.g. with a laser, or may be generated with a combination of a point-like light source and a collimation lens. The point like-light source may be monochromatic, such as the combination of an LED and a pinhole.

The collimated beam may selectively irradiate a predefined probe portion of the test medium through a suitable combination of lenses and/or apertures.

In preferred embodiments, the probe portion is selectively irradiated, such that the acoustic waves overlap the entire cross section of the collimated beam of light when viewed along the beam direction of the collimated beam of light.

By selectively irradiating the test medium with the collimated beam such that the collimated beam interacts with a portion of the test medium, in which the refractive index is modulated by the acoustic waves over its entire cross section, light which passes the test medium unaffected and would create a bright focal point in the center of the focal plane can be suppressed. Hence, the focal plane can be imaged without saturating an image sensor, such that the light intensity distribution may be directly evaluated to determine the acoustic power, e.g. without (e.g. numerically) compensating for the light intensity in the focal point or the use of spatial filters.

In preferred embodiments, selectively irradiating the probe portion of the test medium comprises blocking portions of the collimated beam, in particular with an adjustable aperture, preferably an adjustable aperture having a rectangular shape.

Preferably, the adjustable aperture is arranged in front of the test medium in a segment of the optical path in which the beam of light is collimated, to directly select a cross section of the collimated beam for selectively irradiating the probe portion. The cross section can be selected to correspond to a pre-determined portion of the acoustic wave field, such as a focal point of the ultrasonic emitter or a target interaction volume of a travelling acoustic wave, in order to facilitate a quantitative analysis of the acoustic power based on the light intensity distribution.

In some embodiments, the beam of light is collimated with a collimation lens and an adjustable aperture is arranged along the optical path between the collimation lens and the test medium to select a portion of the collimated beam for selectively irradiating the probe portion.

Preferably, the aperture has a substantially rectangular profile and can be adjusted along two-dimensions, such as to select a width and a height of the collimated beam of light, e.g. along the propagation direction of the acoustic waves and perpendicular to the propagation direction of the acoustic waves, respectively. The rectangular shape may facilitate a calibration of the measurement setup used for performing the method and/or may facilitate a quantitative analysis of the results.

In preferred embodiments, the collimated beam selectively irradiates a predetermined, and in particular an integer, number of extrema of acoustic waves generated by the ultrasonic emitter in the probe portion of the test medium.

The light intensity in each point of the focal plane may effectively correspond to an integral over the induced deflection angles of the collimated beam in the probe portion as a function of the respective deflection distance associated with the point. Irradiating a predetermined (integer) number of extrema can average out regular patterns of the acoustic pressure field (e.g. peaks and troughs) and may therefore facilitate a quantitative assessment of the acoustic power. For example, the width of the aperture along the propagation direction of the acoustic waves may correspond to an integer number of wavelengths of the acoustic waves in the test medium.

Preferably, the probe portion under the effect of the acoustic waves is close to the front focal plane of the optical element or optical assembly, such that the image in the (back) focal plane corresponds to a Fourier transform of the probe portion. In other words, the method may create a Fourier transform of a refractive index distribution in the probe portion of the test medium. The back focal plane of the optical element or optical assembly may be imaged for determining the acoustic power of the ultrasonic emitter, e.g. by obtaining a digitized image of the light intensity distribution with a light-sensitive CMOS or CCD array.

The image of the focal plane can be used to determine the width or magnitude of the spread of the light intensity distribution in the focal plane, e.g. with respect to a focal point of the optical element or optical assembly.

In preferred embodiments, the acoustic power is determined based on a spatial variance of the light intensity distribution in the focal plane with respect to a center of the light intensity distribution and/or with respect to the focal point in said focal plane in absence of the acoustic waves. As the skilled person will appreciate, the spatial variance is an example of the "width" of the light intensity distribution.

The spatial variance of the light intensity distribution along a select axis of the focal plane was found by the inventor to be proportional to the acoustic power. The spatial variance can also be a measure which is only negligibly affected by a modulation of the light intensity distribution, e.g. due to diffraction effects. The spatial variance may be determined with respect to a spatial direction in the focal plane, e.g. corresponding to the propagation direction of the ultrasonic waves or the direction perpendicular to said propagation direction.

In preferred embodiments, determining the refraction-induced width of the light intensity distribution comprises determining a deviation metric based on a value of a select coordinate of a two-dimensional coordinate system of an image of the focal plane, wherein a coordinate axis corresponding to the select coordinate is in particular aligned with the propagation direction of acoustic waves emitted by the ultrasonic emitter or substantially perpendicular to the acoustic wave propagation direction.

The spread of the light intensity distribution in the focal plane may be evaluated with respect to a spatial direction which is parallel or perpendicular to the propagation direction of the acoustic waves, such as to differentiate between a pressure gradient in the test medium arising from a pattern of peaks and troughs of the (traveling) acoustic waves and between a pressure gradient arising from a spatial profile of an acoustic field, e.g. due to a focus geometry of the ultrasonic emitter. The coordinate system may be centered on the focal point of the optical element or optical assembly in the absence of acoustic waves.

Each point of the image may be weighted according to the light intensity value associated with said point. The light intensity value may be considered to contain information regarding the spatial extent or prevalence of regions of the probe portion causing the deflection of beams of light towards the point and being associated with a corresponding pressure gradient.

In preferred embodiments, determining the deviation metric is mathematically equivalent to summing, for a plurality of points of the image of the focal plane, a product of a normalized light intensity value and a squared value of the select coordinate, in particular according to $$\frac{\sum_i I_i * (w_i - w_0)^2}{\sum_i I_i}$$

wherein $I_i$ is the intensity of the light in a point i of (an image of) the focal plane image, $w_i$ is the value of the select coordinate, and $w_0$ is the corresponding value for the center of the focal plane.

For example, the coordinate axis corresponding to the select coordinate $w_i$, $w_0$ may be aligned with the propagation direction of acoustic waves emitted by the ultrasonic emitter or may be substantially perpendicular to the acoustic wave propagation direction.

The above expression may be considered as an experimentally determinable measure which is proportional to an integral over the induced deflection angles of the collimated beam in the probe portion. It can therefore be the basis of a quantitative measure for the acoustic power of the ultrasonic emitter. The plurality of points may be substantially all points of the image, e.g. after the image has been corrected for noise and/or after noisy or saturated pixels (e.g. in the origin of the image) have been removed from the image, but may also be a portion of the points in embodiments, such as the points in a half plane or quadrant of the image, or the points along one axis of the image, or in a corridor around an axis of the image.

Based on the above expression for quantifying the refraction-induced width of the light intensity distribution, the acoustic power W may, for example, be determined according to $$W = K * \frac{\lambda^2 c^3 \rho_0}{4\pi^2 (n_0 - 1)^2 f^2} \frac{\sum_i I_i * w_i^2}{\sum_i I_i},$$

wherein K is a dimensionless constant related to the sound wave profile, which may be determined empirically or numerically, $\lambda$ is the wavelength of the acoustic waves, f is the focal length of the optical element or optical assembly, $\rho_0$ and $n_0$ are the density and refractive index of the test medium in the absence of acoustic waves, respectively, and c is the phase velocity in the test medium (≈1492 m/s for water at 20° C.).

The skilled person will however appreciate that other deviation metrics for quantifying the refraction-induced spread, or in other words, the width of the light intensity distribution, may equally be used, e.g. a deviation that is proportional to the above expression, a measure derived from the standard deviation of the light intensity distribution, or a width of the light intensity distribution containing a predetermined fraction, e.g. 95%, of the luminosity, and the above equation may be adapted accordingly.

Moreover, the skilled person will appreciate that the image of the focal plane may be corrected for background noise prior to determining the refraction-induced width of the light intensity distribution. For example, a low-pass filter may be used to filter noise in the image. As another example, a reference image(s), e.g. with the ultrasonic emitter and/or the collimated beam of light turned off, may be used to correct the image of the focal plane for background noise and/or to determine the center of the focal plane.

In preferred embodiments, the center of the focal plane is determined by imaging the focal plane with the ultrasonic emitter turned off and determining the weighted average of the light intensity in a resulting image of the focal plane in absence of ultrasonic waves.

The skilled person will appreciate that the ultrasonic waves can be focused onto an ultrasonic focus based on the ultrasonic emitter configuration and/or geometry. In some embodiments, the ultrasonic emitter comprises an array of ultrasonic transmitters which can be selectively controlled with respect to their amplitude and/or phase such as to selectively generate an ultrasonic focus in a pre-defined location. The ultrasonic focus location may be selectively displaceable around a default location by adjusting the phase and/or amplitude of a plurality of ultrasonic transmitters. For example, the ultrasonic emitter may be adapted to create the ultrasonic focus in a geometric focus location of the array of ultrasonic transmitters, when the phase of the emitters is in a default state, and configured to create the ultrasonic focus in a different location by adjusting the phases of the ultrasonic transmitters in the array of ultrasonic transmitters. The array of ultrasonic transmitters may feature a substantially spherical geometry defining a geometric focus, and the ultrasonic focus location may be shifted by selectively controlling the elements of the array.

Accordingly, the term "ultrasonic emitter" should be considered to include "a plurality of ultrasonic transmitters" arranged to induce an acoustic field in the test medium as a composite ultrasonic emitter, and in particular an "array of ultrasonic transmitters", e.g. with selectively controllable phase and/or amplitude of the individual ultrasonic transmitters.

The acoustic power of a plurality of ultrasonic transmitters may be determined in the geometric focus of the plurality of ultrasonic transmitters (e.g. array), but may also be determined in a different, displaced focus location in some embodiments. A dimensionless constant pertaining to the spatial profile of the acoustic field in the probe region may be adjusted for the displaced focus location, e.g. by empirical determination of the respective phenomenological constant. Moreover, the acoustic power may also be determined outside of the acoustic focus by taking into account an empirically or numerically determined phenomenological constant for the spatial profile of the acoustic field outside of the acoustic focus, i.e. by determining the refraction induced width of the light intensity distribution in the focal plane, e.g. with respect to a center of the focal plane.

In preferred embodiments, the center of the focal plane is determined based on the weighted average of the light intensity in the focal plane.

The test medium should have the physical property that the refractive index of the test medium is a function of the sound pressure in the test medium, e.g. a linear function in accordance with the Gladstone-Dale relation, a relationship which has been experimentally verified for water for pressures of up to 500 MPa.

Moreover, the test medium should be substantially transparent for the acoustic waves and the collimated beam of light, e.g. feature an absorption of less than 50%, less than 30%, less than 10%, or less than 5% of the acoustic or optical power during transmission through the probe portion, respectively. In many applications, water will be a suitable test medium as it is impedance-matched to most medical ultrasonic emitters, e.g. in the case of diagnostic and therapeutic ultrasonic emitters. However, the skilled person will appreciate that other test media, such as gels, oils, or solid state media, may alternatively be used in conjunction with the method.

In preferred embodiments, the test medium is a liquid, in particular a transparent liquid, preferably water or another liquid with an impedance similar to the one of water, and the method comprises mounting the ultrasonic emitter in a container of the test medium for coupling the ultrasonic emitter to the test medium.

For example, an impedance may be considered similar to the one of water, when an acoustic impedance of the test medium at an operating frequency of the ultrasonic emitter is within 50% of the impedance of water, such as to facilitate energy transfer from the ultrasonic emitter to the test medium, e.g. with a reflection of less than 50% of the acoustic power at the interface between the ultrasonic emitter and the test medium.

The skilled person will appreciate that the method can be applied for traveling as well as standing waves. The method may (inherently) integrate over a plurality of wavelengths of the acoustic waves as part of determining the refraction-induced width/spread of the light intensity distribution, independently of whether the acoustic waves are standing, traveling, or stroboscopically probed with a pulsed collimated beam of light. Moreover, since the method may rely predominantly on a "refractive" effect on the collimated beam of light in the test medium, the light source may not need to be coherent in some embodiments.

The method may be advantageously applied for determining the acoustic power in an acoustic focus of the ultrasonic emitter, which may feature a high acoustic power that cannot be readily measured with methods of the prior art.

In preferred embodiments, the acoustic power is determined in an ultrasonic focus of the ultrasonic emitter, and the method comprises inducing the ultrasonic focus in the test medium and selectively irradiating the ultrasonic focus with the collimated beam of light, in particular between first or second order minima of the ultrasonic focus.

Preferably, the ultrasonic focus is selectively irradiated in a cylindrical portion of the acoustic field close to the ultrasonic focus, and the cylindrical portion may be selected with an adjustable rectangular aperture for blocking portions of the collimated beam of light. The first order minima may appear as first order zeros in a Schlieren image of the ultrasonic focus, and an aperture may be adjusted to selectively irradiate the ultrasonic focus in between the first order zeros in the Schlieren image of the ultrasonic focus. However, the skilled person will appreciate that any vertical or horizontal feature of the ultrasonic focus, and in particular any zeros or extrema of the Schlieren image of the ultrasonic focus, e.g. with respect to an axis perpendicular to the propagation direction of the acoustic waves, may be employed in practice in order to calibrate the aperture for determining the acoustic power.

In a second aspect, the invention relates to a system for determining an acoustic power of an ultrasonic emitter. The system comprises an interface, an aperture, an optical element or optical assembly, an imaging assembly, and a processing system. The interface is configured to couple the ultrasonic emitter to a test medium. The aperture is configured to select a portion of a collimated beam of light to irradiate a probe portion of said test medium, in which acoustic waves generated by the ultrasonic emitter are present, with a collimated beam of light. The optical element or optical assembly is configured to focus the collimated beam onto a focal plane in the absence of acoustic waves. The imaging assembly is configured to obtain an image of the focal plane. The processing system is configured to determine the acoustic power of the ultrasonic emitter based on a refraction-induced width of the light intensity distribution in the image of the focal plane.

The interface may be a coupling portion of a test medium (or of a container holding the test medium) to receive the ultrasonic emitter and to couple acoustic waves into the test medium at the coupling portion. The interface may define a pre-defined position for receiving the ultrasonic emitter in the system. For example, the interface may comprise a holder configured to hold the ultrasonic emitter at a predefined position (e.g. on a fixed mounting bracket, a scanning stage or a translatable carriage). The interface may be configured to orient the ultrasonic emitter with respect to the test medium, such that the ultrasonic emitter generates acoustic waves along a propagation direction and intersecting with the collimated beam of light.

The optical element or optical assembly may be configured to create a Fourier transform of a refractive index distribution in the probe portion of the test medium selectively irradiated with the collimated beam. For example, the interface may be arranged to receive the ultrasonic emitter such that the probe portion lies close to a front focal plane of the optical element or optical assembly. In some embodiments, a holder is configured to hold the ultrasonic emitter in a pre-defined position in which it is oriented such that the acoustic waves are emitted towards the probe portion close to the front focal plane.

The processing system may comprise a single processing unit or may comprise a plurality of processing units which may be functionally connected. The processing units may comprise a microcontroller, an ASIC, a PLA (CPLA), an FPGA, or other processing device, including processing devices operating based on software, hardware, firmware, or a combination thereof. The processing devices can include an integrated memory, or communicate with an external memory, or both, and may further comprise interfaces for connecting to sensors, devices, appliances, integrated logic circuits, other controllers, or the like, wherein the interfaces may be configured to receive or send signals, such as electrical signals, optical signals, wireless signals, acoustic signals, or the like.

The processing system may comprise or control signal generators and amplifiers for controlling an operation state or an emission pattern of the ultrasonic emitter and/or may control light emission from a light source for generating the collimated beam of light. Further, the processing unit may comprise an interface for receiving light intensity information related to the image and may send control signals to an image sensor for controlling an imaging process.

In preferred embodiments, the imaging assembly comprises a two-dimensional image sensor array, in particular a CCD sensor array, for obtaining the image of the focal plane, wherein the two-dimensional image sensor array is preferably arranged in the focal plane.

In preferred embodiments, the processing system is configured to determine the refraction-induced width of the light intensity distribution by determining a deviation metric based on a value of a select coordinate of a two-dimensional coordinate system of an image of the focal plane, wherein a coordinate axis corresponding to the select coordinate is in particular aligned with the propagation direction of acoustic waves emitted by the ultrasonic emitter or substantially perpendicular to the acoustic wave propagation direction.

In preferred embodiments, determining the deviation metric is mathematically equivalent to summing, for a plurality of points of the image of the focal plane, a product of a normalized light intensity value and a squared value of the select coordinate, in particular according to $$\frac{\sum_i I_i * (w_i - w_0)^2}{\sum_i I_i}$$

wherein $I_i$ is the intensity of the light in a point i of the image, $w_i$ is the value of the select coordinate, and $w_0$ is the corresponding value for the center of the focal plane.

In preferred embodiments, the processing system is configured to determine the center of the image of the focal plane based on the weighted average of the light intensity in the image of the focal plane.

In preferred embodiments, the processing system is configured to determine the center of the image of the focal plane by recording an image of the focal plane with the ultrasonic emitter turned off and determining the weighted average of the light intensity in a resulting image of the focal plane in the absence of ultrasonic waves.

In preferred embodiments, the aperture is adjustable and in particular rectangular, wherein preferably two dimensions of the rectangular aperture are individually adjustable.

In preferred embodiments, the system is configured to selectively irradiate a predetermined, and in particular an integer, number of extrema of acoustic waves from the ultrasonic emitter with the collimated beam.

In preferred embodiments, the acoustic power is determined in an ultrasonic focus of the ultrasonic emitter, and the system is configured to selectively irradiate the ultrasonic focus with the collimated beam of light, in particular between first or second order minima of the ultrasonic focus.

In preferred embodiments, the test medium is a liquid, in particular a transparent liquid, preferably water or another liquid with an impedance similar to the one of water, the system comprises a transparent container for the test medium and the interface is adapted to couple the ultrasonic emitter to the test medium in the container.

In preferred embodiments, the system further comprises a point-like light source and a collimation lens configured to create the collimated beam of light, wherein the point-like light source in particular comprises an LED and/or a pinhole.

For example, the LED may constitute a point-like light source. In some embodiments, the pinhole is used to limit the spatial origin of a light source to implement a point-like light source for the purpose of the system. In some embodiments, both an LED and a pinhole are used to provide a point-like light source.

In preferred embodiments, the system comprises a holder configured to hold the ultrasonic emitter at a position such that a distance between the probe portion and the optical element or optical assembly along a beam direction of the collimated beam of light corresponds to a focus length of the optical element or optical assembly.

In some embodiments, the system further comprises a spatial filter configured and/or arranged to attenuate a luminosity associated with a focal point of the focal plane or of an image thereof in the absence of acoustic waves for reconstructing a Schlieren image of the acoustic waves in the test medium.

For example, the system may comprise a beam splitter in the optical path between the optical element or optical assembly and the imaging assembly, wherein the beam center is configured to split the collimated beam after interaction with the test medium into a first beam of light towards the imaging assembly and a second beam of light towards the spatial filter.

Alternatively, the imaging assembly for imaging the focal plane may be reconfigurable between a first configuration, in which the focal plane is imaged by an image sensor, and a second configuration, in which an image of the probe portion of the test medium is reconstructed on the image sensor. In the second configuration, the spatial filter may filter the focal point of the focal plane (or of an image thereof) for reconstructing a Schlieren image of the acoustic waves in the test medium. As an example, an optical element of the imaging assembly may be adjustable or exchangeable to select the first configuration or the second configuration, and a reconfigurable spatial filter may selectively filter portions of an intermediate image of the focal plane in the imaging assembly to selectively image the Schlieren image or the image of the focal plane.

The Schlieren image of the acoustic waves in the test medium may be used to adjust the aperture to selectively irradiate a specific portion of the test medium. For example, an operator may adjust the aperture such that the focal point of the ultrasonic emitter is selectively irradiated with the collimated beam of light, and may subsequently determine the acoustic power based on the light intensity distribution in the focal plane. Hence, the correct position of the aperture may be verified prior to the measurement of the acoustic power, such that the determination of the acoustic power may be more accurate. In some embodiments, the system is configured to drive the light source in a pulsed mode at a frequency corresponding to the (operational) frequency of the ultrasonic emitter, such that the collimated beam of light stroboscopically probes the acoustic waves in the test medium for obtaining the Schlieren image.

The skilled person will however appreciate that such a calibration with a Schlieren image is merely optional. For example, the spatial emission profile of a focused ultrasonic emitter can be known, and the system may be configured to selectively irradiate the ultrasonic focus of the focused ultrasonic emitter at a known spatial location. Moreover, the calibration may be performed automatically based on the Schlieren image in some embodiments.

In a third aspect, the invention relates to a computer program comprising machine readable instructions, which when the computer program is executed by a processing system cause the processing system to implement a method according to the first aspect.

DETAILED DESCRIPTION OF EMBODIMENTS

The features and numerous advantages of the method and system according to the present invention will best be understood from a detailed description of preferred embodiments with reference to the accompanying drawings, in which:

FIG. 1 schematically illustrates an example of a system for calibrating an acoustic power of an ultrasonic emitter;

Figure 1:
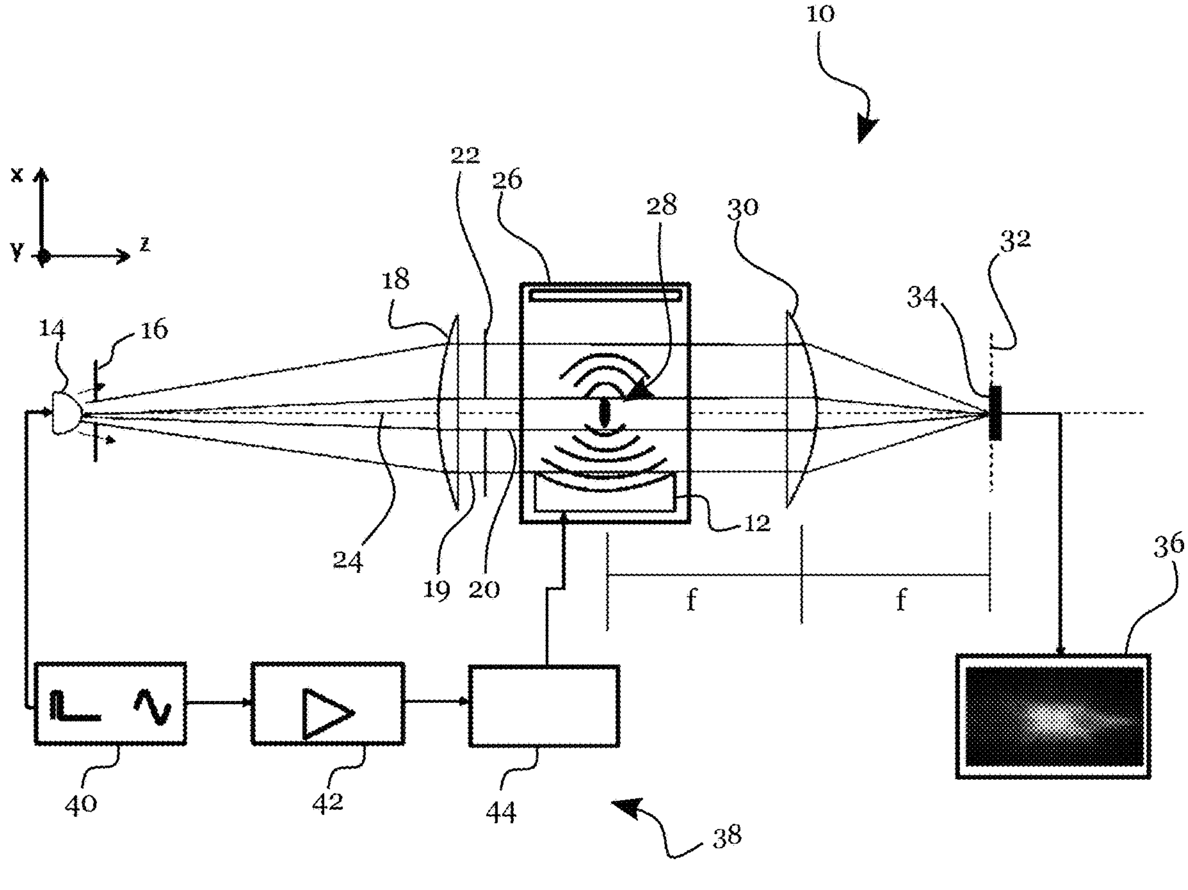

FIG. 1 schematically illustrates an example of a system 10 for calibrating an acoustic power of an ultrasonic emitter 12. The system 10 comprises a light source 14 illuminating a pinhole 16 for forming a point-like light source of electromagnetic waves. Preferably, the light beam emitted by the light source 14 is in the visible spectrum, e.g. having a wavelength between 310 nm and 1100 nm, preferably between about 380 nm and about 750 nm, to facilitate the calibration and control of the system 10 for a human operator. The light source 14 may be monochromatic to minimize the effect of aberrations. For example, the light source 14 may be an LED or a laser.

The point-like light source 14 should be arranged in the focal plane of a collimation lens 18, such that the light beam originating from the light source 14 forms a collimated beam of light 19 behind the collimation lens 18. The collimated beam of light 19 is passed through an aperture 22 blocking a portion of the collimated beam of light 19. A transmitted portion of the collimated beam of light 20 may then have a cross section corresponding to the cross section of the aperture 22 when viewed along the beam direction 24.

The collimated beam of light 20 may be incident on transparent walls of a container 26 of a test medium, typically water, in which the ultrasonic emitter 12 can be mounted. The ultrasonic emitter 12 may be driven to induce acoustic waves in the test medium in the container 26, e.g. with an ultrasonic focus 28 as shown in FIG. 1.

In the following discussion, an explicit method for quantitatively determining the acoustic power in the ultrasonic focus 28 will be disclosed. However, the skilled person will appreciate that this application is merely exemplary and that the method may equally be used to determine the acoustic power of an unfocused ultrasonic emitter, e.g. in a field of standing or travelling plane waves.

The aperture 22 is preferably adjusted such that the acoustic waves and the transmitted portion of the collimated beam of light 20 overlap over the entire cross section of the transmitted portion of the collimated beam of light 20 when viewed along the beam direction 24. For example, the cross section of the transmitted collimated beam of light 20 may correspond to a rectangle with a height corresponding to a distance a between the first order minima of the ultrasonic focus 28 along the y-direction (perpendicular to the plane of projection) and a width corresponding to a predetermined number of extrema of the acoustic waves, such as 5 wavelengths. The first order minima may appear as first order zeros in a Schlieren image of the ultrasonic focus 28, and the aperture 22 may therefore be adjusted along the y-direction based on the positions of regions with low light intensity in experimentally available images of the region of interest. The transmitted portion of the collimated beam of light 20 intersects the acoustic waves at an approximately right angle, such as an angle between 70° to 110°, e.g. substantially 90°.

After the collimated beam of light 20 has interacted with the test medium under the influence of the acoustic waves, it is passed through a focusing lens 30 configured to focus the collimated beam of light 20 onto a focal plane 32. The focusing lens 30 may be arranged at a distance along the beam direction 24 from the investigated region of interaction, e.g. the ultrasonic focus 28, which may correspond to the focal length f of the focusing lens 30. The distance may be about the focal length f in order to obtain a Fourier transform of the ultrasonic focus 28 in the focal plane 32. However, as the refraction angles may generally remain small, the depth of field can be comparatively large, such that the distance between the investigated region of interaction and the focusing lens 30 need not be strictly equal to f. For example, for quantifying an optical power of plane wave ultrasound fields, the front focal plane of the focusing lens 30 may be arranged at the geometrical centre of an unfocussed ultrasound field, which may considerably extend along the light beam direction 24. The skilled person will appreciate that the depth of field can be selected to be suitable for the geometry of the acoustic wave field, e.g. by employing a focusing lens 30 with reduced or increased focal length f. The focusing lens 30 may then be considered to effectively create a Fourier transform of the refractive index distribution in the ultrasonic focus 28 selectively irradiated with the collimated beam of light in the focal plane 32 located on the opposite side of the focusing lens 30 and spaced by the focal length f from the focusing lens 30.

A two-dimensional image sensor array 34, e.g. a CMOS or CCD screen, is arranged in the focal plane 32 to image the focal plane 32 and to obtain a digitized image that can be reproduced on a computer screen 36.

A control system 38 may control an acoustic wave emission by the ultrasonic emitter 12 and may also control a light emission of the light source 14. For example, a signal generator 40 may generate periodic signals for controlling the emission of the ultrasonic emitter 12 and/or the light source 14, e.g. may generate harmonic (e.g. sine) waves and/or pulses to be transmitted to the ultrasonic emitter 12 and the light source 14, respectively. The harmonic wave signal may be amplified by an amplifier 42 and the signal may be impedance-matched to the ultrasonic emitter 12 in a matching circuit 44 for driving the ultrasonic emitter 12. In some examples, the light source 14 is pulsed at an operating frequency of the ultrasonic emitter 12, such as to stroboscopically probe the acoustic wave field.

Figure 2:
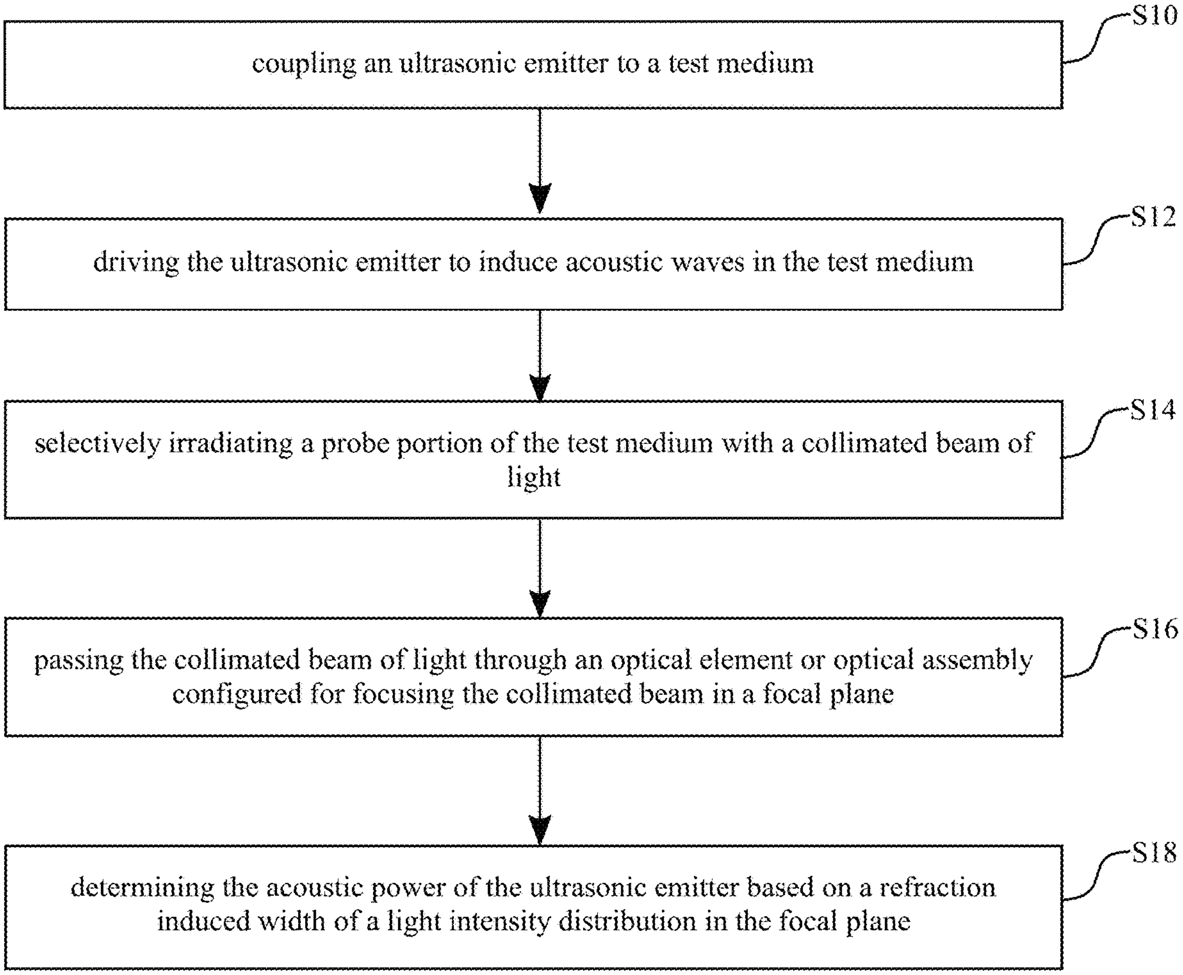
FIG. 2 illustrates a flow chart of a method for determining the acoustic power of the ultrasonic emitter according to an example.

FIG. 2 illustrates a flow chart of a method for determining the acoustic power of an ultrasonic emitter 12 according to an example. The method comprises coupling the ultrasonic emitter 12 to a test medium (S10) and driving the ultrasonic emitter 12 to induce acoustic waves in the test medium along an acoustic wave propagation direction (S12), the acoustic waves causing a change of the refractive index of the test medium. The method further comprises selectively irradiating a probe portion 28 of the test medium with a collimated beam of light 20 (S14), wherein the probe portion is irradiated along a beam direction 24 which is different from the acoustic wave propagation direction, such that the collimated beam of light 20 intersects the acoustic waves. The method also comprises passing the collimated beam of light 20 through an optical element 30 or optical assembly configured for focusing the collimated beam of light 20 in a focal plane 32 (S16), and determining the acoustic power of the ultrasonic emitter 12 based on a refraction-induced width of a light intensity distribution in the focal plane 32 (S18).

For example, the image of the focal plane 32 obtained with the two-dimensional image sensor array 34 in FIG. 1 may be analyzed by a processing unit to determine the refraction-induced width of the light intensity distribution. The processing unit may derive a quantitative measure of the acoustic power in the ultrasonic focus 28 from the refraction-induced width.

Figure 3:
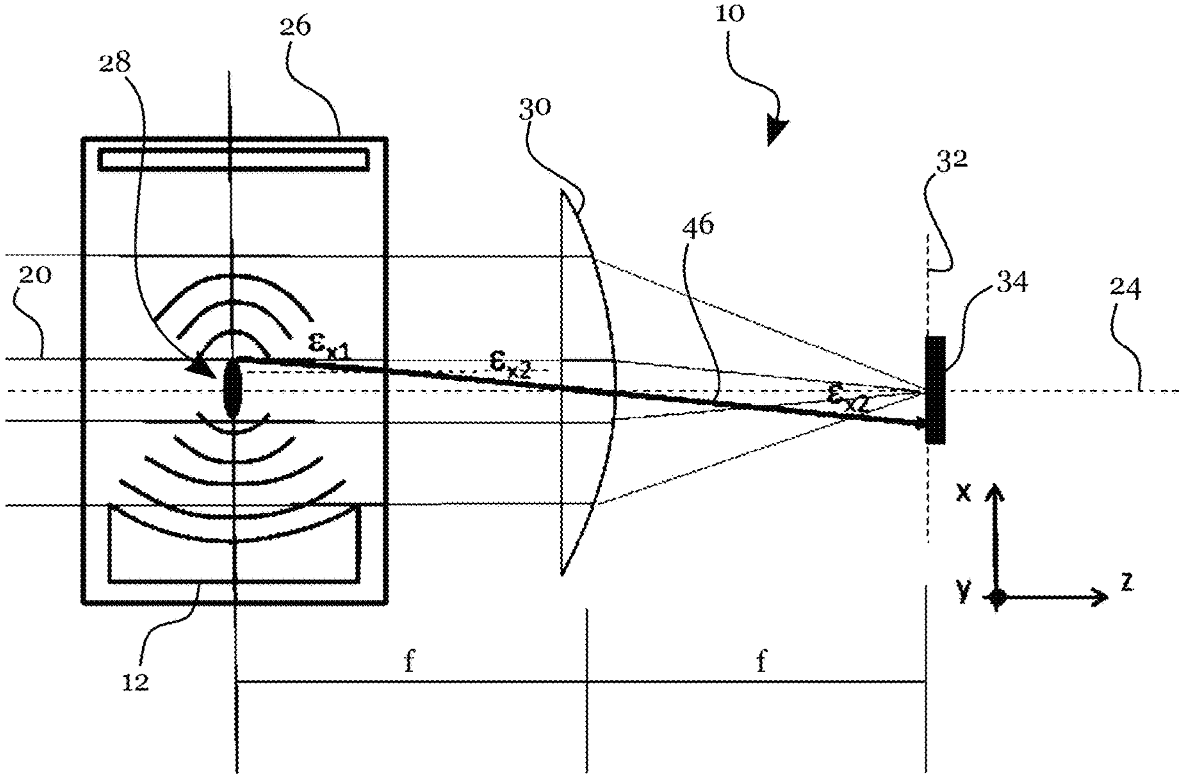
FIG. 3 illustrates a geometric construction of the direction of a deflected beam of light in a portion of the system illustrated in FIG. 1.

FIG. 3 illustrates a geometric construction of the direction of a deflected beam of light 46 in a portion of the system 10 illustrated in FIG. 1. The light intensity distribution in each point of the focal plane 32 may be considered to effectively correspond to an integral over the deflection angles of the collimated beam of light 20 in the selectively irradiated ultrasonic focus 28 arising due to a refractive index modulation in the ultrasonic focus.

The modulation of the refractive index of the test medium in the container 26 arising from a varying pressure in the test medium may be quantitatively determined according to the Gladstone Dale relation:

$$\rho = \frac{n-1}{n_0-1}\rho_0 \tag{1}$$

with $n_o$ being the refractive index without pressure, n being the dynamic refractive index under pressure and $\rho_o$ and $\rho$ being the corresponding pressures. For water as the test medium, the above expression may be used to derive the change of the refractive index according to $$\frac{dn}{dp} = \frac{n_0-1}{c^2\rho_0} = 1.50\cdot\frac{10^{-4}}{MPa} \tag{2}$$

wherein c is the phase velocity of the acoustic wave in water. The refractive index modulation induces a refraction of the incident collimated beam of light 20.

As a result, the collimated beam of light 20 may be diffracted at angles $\varepsilon_{x1}$ (highlighted for the deflected beam 46 in FIG. 3) and $\varepsilon_{y1}$ (not shown) with respect to the x and y direction, respectively, according to $$\varepsilon_{x1} = \int_z \frac{1}{n}\frac{dn}{dx}dz;\ \varepsilon_{y1} = \int_z \frac{1}{n}\frac{dn}{dy}dz \tag{3}$$

The refractive index modulation along x/y can be written as a function of the modulation of the pressure along x and y according to $$\frac{dn}{dx} = \frac{dn}{dp}\cdot\frac{dp}{dx},\ \frac{dn}{dy} = \frac{dn}{dp}\cdot\frac{dp}{dy} \tag{4}$$

resulting in the expressions $$\varepsilon_{x1} = \frac{n_0-1}{c^2\rho_0}\int_z \frac{1}{n}\frac{dp}{dx}dz;\ \varepsilon_{y1} = \frac{n_0-1}{c^2\rho_0}\int_z \frac{1}{n}\frac{dp}{dy}dz \tag{5}$$

for the angles $\varepsilon_{x1}$ and $\varepsilon_{x2}$ of the deflected beam 46 after passing the ultrasonic focus 48. As the variation of the refractive index n in absolute values is small, Eq. (5) may be approximated by $$\varepsilon_{x1} = \frac{n_0-1}{n_0\cdot c^2\rho_0}\int_z \frac{dp}{dx}dz;\ \varepsilon_{y1} = \frac{n_0-1}{n_0\cdot c^2\rho_0}\int_z \frac{dp}{dy}dz \tag{6}$$

The angles $\varepsilon_{x1}$ and $\varepsilon_{y1}$ in water may be transformed to angles in air $\varepsilon_{x2}$ and $\varepsilon_{y2}$ after the collimated beam of light 20 has passed the container 26 according to Snell's law $$\frac{\sin\varepsilon_{x1}}{\sin\varepsilon_{x2}} = \frac{1}{n_0};\ \frac{\sin\varepsilon_{y1}}{\sin\varepsilon_{y2}} = \frac{1}{n_0} \tag{7}$$

The skilled person will appreciate that in principle, the material of the container 26 may induce an additional deflection. However, for the sake of simplicity, this usually small deflection will be neglected in the following.

Figure 4:
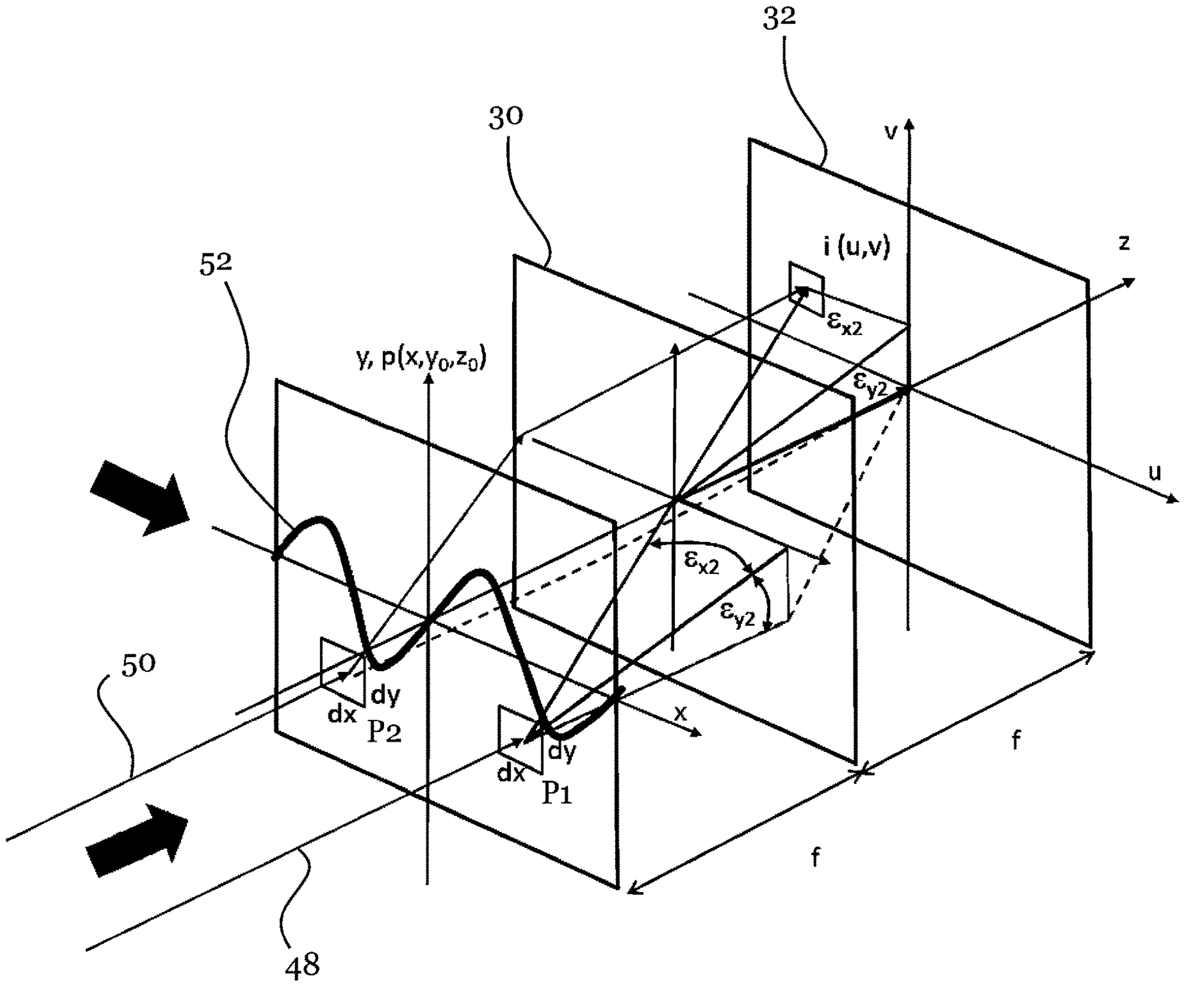
FIG. 4 illustrates the geometric construction of the image in the focal plane for exemplary deflected optical beams.

FIG. 4 illustrates the geometric construction of the image in the focal plane 32 for a first deflected beam of light 48 and a second deflected beam of light 50 caused by a modulated refractive index distribution in a test medium (schematically illustrated by a first plane) arising due to an harmonic acoustic wave 52. The first deflected beam of light 48 is deflected by angles $\varepsilon_{x2}$ and $\varepsilon_{y2}$ at the point in space P1 and passes through the center of the focusing lens 30 substantially unaffected.

The second deflected beam of light 50 is incident on a different point in space P2, which has the same pressure gradient as P1 and is therefore deflected by the same angles $\varepsilon_{x2}$ and $\varepsilon_{y2}$. The second deflected beam of light 50 is not incident on the center of the focusing lens 30 and is therefore refracted by the focusing lens 30. However, as the first deflected beam of light 48 and the second deflected beam of light 50 are deflected at the same angles $\varepsilon_{x2}$ and $\varepsilon_{y2}$, they are focused onto the same point of the focal plane 32 as shown in FIG. 4. Hence, the light intensity distribution in the focal plane 32 can allow inference on the deflection angles $\varepsilon_{x2}$ and $\varepsilon_{y2}$, and therefore the pressure profile generated by the acoustic wave 52.

The angles $\varepsilon_{x2}$ and $\varepsilon_{y2}$ may generally be small (on the order of a few mrad), such that $\varepsilon_{x,y,1,2} \approx \tan \varepsilon_{x,y,1,2} \approx \sin \varepsilon_{x,y,1,2}$, such that the deflection in the focal plane 32 may be approximated as $$\varepsilon_{x2} \approx \tan\varepsilon_{x2} = \frac{u}{f}; \varepsilon_{y2} \approx \tan\varepsilon_{y2} = \frac{v}{f} \tag{8}$$

with f being the focal length of the focusing lens 30 and u and v being the coordinates in the image of the focal plane 32 that correspond to the x- and y-directions in the container 26, respectively. The above approximation related to the angles $\varepsilon_{x,y,1,2}$ can also allow neglecting a deflection in the x- and y-directions during the passage of the deflected beam of light 46 through the acoustic focus 28, such that the z-axis integral of Eq. (6) can be a decent approximation for determining the angles $\varepsilon_{x2}$ and $\varepsilon_{y2}$.

Since the variation of the average pressure field p(x,y,z,t) along the acoustic wave propagation direction close to the ultrasonic focus 28 can be negligible, i.e. for harmonic waves in a test medium with negligible absorption, the effective intensity of the sound waves may be determined based on the pressure field p(x,y,z,t) according to $$I_{eff}(y, z) = \frac{1}{t_{av}}\int_0^{t_{av}} \frac{p^2(x, y, z, t)}{\rho_0 c}dt = \frac{1}{x_{av}}\int_0^{x_{av}} \frac{p^2(x, y, z, t)}{\rho_0 c}dx \tag{9}$$

with $t_{au}$, and $x_{av}$ being the averaging time and the averaging length along x, respectively.

The acoustic power W may be determined as the integral of the effective intensity Ieg over an area A according to $$W = \int_A I_{eff}(y, z)dA = \frac{1}{x_{av}}\int\int_A\int_0^{x_{av}} \frac{p^2(x, y, z)}{\rho_0 c}dxdydz \tag{10}$$

wherein the area A can be considered to effectively correspond to the cross section of the collimated beam 20 in the system 10 of FIG. 1.

The pressure gradient of Eq. (5) could in principle be determined based on the deflection angle as a function of the real space origin of the deflected beam of light 46, i.e. $\varepsilon_{x1}(x,y)$, and Eq. (10) could be accordingly evaluated based on the measurement of this function. The measurement of $\varepsilon_{x1}(x,y)$ is however experimentally challenging.

Instead the inventor derived a phenomenological approximation of the acoustic power for the example of acoustic waves in an approximately spherical acoustic focus. The skilled person will appreciate from the following discussion that this approximation can be extended to plane waves or a non-spherical focus.

The majority of the intensity (approx. 87%) may be contained between the first order minima of the acoustic focus (along y in FIG. 1), which may therefore be used as a suitable vertical boundary of the area A that can be experimentally selected with the aperture 22.

For intermediate acoustic power levels in the ultrasonic focus 28, the acoustic wave can be assumed to be harmonic, such that the pressure integral of Eq. (10) can be approximated as $$\int_{-a/2}^{a/2} p^2(x, y, z)dz \approx \frac{K}{a}\left[\int_{-a/2}^{a/2} p(x, y, z)dz\right]^2 \tag{11}$$

wherein K is a dimensionless constant taking into account the pressure profile of the ultrasonic focus 28. The inventor found that, since the focus geometry is dominated by diffraction, K will vary negligibly both with acoustic power and with the type of ultrasonic emitter 12 used, and can therefore be determined experimentally for a given F-number and test medium. Preferably, a look-up table for ultrasonic emitters 12 of different F-number and in different test media is prepared and a suitable K can be selected from the look-up table. For an ultrasonic emitter 12 with F-number F/1 in water, K was experimentally found to be approximately 2.

The integral of Eq. (11) may be simplified by considering that the acoustic wave is harmonic such that the pressure p(x) and the pressure gradient dp(x)/dx are related according to $$p(x) = \hat{p}\cos(\omega t - kx) \quad \frac{1}{k}\left(\frac{dp}{dx}\right) = -\hat{p}\sin(\omega t - kx) \tag{12}$$

wherein $\hat{p}$ is the pressure amplitude, ω is the angular frequency of the acoustic wave, and k is the wave number of the acoustic wave (which is related to the wavelength of the acoustic wave according to $k=2\pi/\lambda$). Hence, the integral over the pressure field in Eq. (11) can be expressed in terms of an integral over the pressure gradient according to $$\frac{K}{a}\left[\int_{-a/2}^{a/2} p(x, y, z)dz\right]^2 \approx \frac{K}{a}\left[\int_{-a/2}^{a/2} \frac{1}{k}\frac{dp(x, y, z)}{dx}dz\right]^2 \tag{13}$$

which, using Eq. (6)-(8) can be reformulated towards the following expression dependent on the real space deflection u, v in the focal plane 32 of the focusing lens 30

$$\frac{K}{a}\left[\int_{-a/2}^{a/2} \frac{1}{k}\frac{dp(x, y, z)}{dx}dz\right]^2 = \frac{K}{a}\left[\frac{1}{k}\varepsilon_{x2}\frac{c^2\rho_0}{n_0 - 1}\right]^2 = \frac{K}{a}\left(\frac{c^2\rho_0}{(n_0 - 1)k\cdot f}\right)^2 u(x, y)^2 \tag{14}$$

resulting in the following expression for the acoustic power:

$$W = \frac{K}{a\rho_0 c}\left(\frac{c^2\rho_0}{(n_0-1)k\cdot f}\right)^2 \frac{1}{x_{av}} \int_{-a/2}^{a/2}\int_0^{x_{av}} u(x, y)^2 dxdy \tag{15}$$

The solution of the integral may experimentally correspond to a variance of the light intensity distribution in the focal plane 32 along the direction u (equivalent to the propagation direction of the acoustic waves along x) according to $$\frac{1}{a\cdot x_{av}}\int_{-a/2}^{a/2}\int_0^{x_{av}} u(x)^2 dxdy = \frac{\sum_i I_{Li}\cdot u_i^2}{\sum_i I_{Li}} =: \langle u^2\rangle \tag{16}$$

wherein the summation is over all pixels i of a detector 34 in the focal plane 32 and $I_{Li}$ is the light intensity in each of the i pixels.

This leads to the following expression for the acoustic power $$W = K\cdot\frac{\lambda^2 c^3\rho_0}{4\pi^2(n_0-1)^2 f^2}\cdot\langle u^2\rangle \tag{17}$$

which may depend solely on the variance along the u direction and the phenomenological constant K, apart from variables of the experimental setup, i.e. the focal length f of the focusing lens 30, the wavelength of the acoustic waves λ, the density ρo and refractive index $n_o$ of the test medium, and the phase velocity c in the test medium. Indeed, quantitatively determining the acoustic power W may require only the determination of a single, experimentally accessible, phenomenological parameter (K) to take into account the spatial acoustic wave profile in the test geometry.

Hence, the geometric spread of the light intensity distribution of the focal plane 32 may be used to quantitatively asses the acoustic power in the ultrasonic focus 28. The deflection along u may be essentially caused by the pressure gradient induced by the sequence of peaks and troughs of the acoustic waves, such that the expression of Eq. (15) may be extended to plane (travelling) waves in a straightforward manner.

As shown in FIG. 4, the deflected beam of light 46 may also be deflected along the u-direction according to the pressure gradient along the y-direction by the angle $\varepsilon_{y2}$:

$$\varepsilon_{y2}(x, y) = \frac{v(x, y)}{f} = \frac{n_0-1}{c^2\rho_0}\int_z \frac{dp(x, y, z)}{dy}dz \tag{18}$$

The deflection along y may be caused by the pressure profile of the ultrasonic focus 28 perpendicular to the propagation direction of the acoustic waves. In the ultrasonic focus 28 of an exemplary circular ultrasonic emitter 12, the pressure profile may follow a jinc function according to $$p(x, r, \lambda) = p_0(x)\cdot jinc\left(\frac{rd}{\lambda x}\right), \tag{19}$$

$$jinc(x) := 2J_1(2\pi x)/(2\pi x)$$

in the far field, wherein $J_1$ is the first order Bessel function with the zero r at $$r = a/2 = 1.22\frac{\lambda x}{d} \tag{20}$$

and wherein d is the diameter of a circular ultrasonic emitter 12 used to generate the ultrasonic focus 28.

Generally, for an approximately cylinder-shaped pressure profile in the ultrasonic focus 28, the pressure profile may be separated into radial (i.e. along the radial direction r) and axial parts (along x), e.g. according to $$p(x, r) = p_0(x)\cdot g(r) \tag{21}$$

which allows approximating the average radial gradient according to $$\overline{\frac{dp(x, r)}{dr}} = M\frac{p_0(x)}{a/2} \tag{22}$$

wherein $r=\sqrt{y^2+z^2}$ and M is an averaging parameter related to the radial form of the pressure distribution.

For evaluating the integral of Eq. (10), Eq. (11) may be approximated as a function of the (average) pressure gradient along y, dp/dy, according to $$\frac{K}{a}\left[\int_{-a/2}^{a/2} p(x, r)dz\right]^2 \approx \frac{K}{a}\left[\int_{-a/2}^{a/2}\frac{a/2}{M}\frac{dp(x, r)}{dy}dz\right]^2 = \frac{Ka}{4M}\left[\int_{-a/2}^{a/2}\frac{dp(x, y, z)}{dy}dz\right]^2 \tag{23}$$

wherein the gradient along y has been expressed approximately through the pressure gradient along the radial direction r $$\frac{dp(x, r)}{dy} = \frac{dp(x, r)}{dr}\frac{dr}{dy} = \frac{dp(x, r)}{dr}\frac{d}{dy}\sqrt{y^2+z^2} \approx M\frac{p_0(x)}{a/2} \tag{24}$$

and a correction due to the radial form of the pressure profile has been approximated as part of the phenomenological constant M. Substituting with Eq. (18) in Eq. (23) results in $$\frac{Ka}{4M}\left[\int_{-a/2}^{a/2}\frac{dp(x, y, z)}{dy}dz\right]^2 = \frac{Ka}{4M}\left[\varepsilon_{y2}\frac{c^2\rho_0}{n_0-1}\right]^2 = \frac{Ka}{4M}\left(\frac{c^2\rho_0}{(n_0-1)\cdot f}\right)^2 v(x, y)^2 \tag{25}$$

such that the acoustic power may be expressed as a function of the deflection along v (corresponding to the y-direction) as $$W = \frac{Ka}{4M\rho_0 c}\left(\frac{c^2\rho_0}{(n_0-1)\cdot f}\right)^2 \frac{1}{x_{av}} \int_{-a/2}^{a/2}\int_0^{x_{av}} v(x,y)^2 dxdy \tag{26}$$

wherein the integrals may be experimentally determined as the variance of the image in the focal plane 32 along v $$\frac{1}{a\cdot x_{av}} \int_{-a/2}^{a/2}\int_0^{x_{av}} v(x)^2 dxdy = \frac{\sum_i I_{Li}\cdot v_i^2}{\sum_i I_{Li}} =: \langle v^2 \rangle \tag{27}$$

and the acoustic power may be evaluated according to $$W = L\cdot \frac{a^2 c^3 \rho_0}{4(n_0-1)^2 f^2}\cdot\langle v^2\rangle \tag{28}$$

wherein K and M have been combined into a phenomenological constant L=K/M which results from the radial profile of the ultrasonic focus 28, and may be numerically or empirically determined. For the spherical ultrasonic focus 28 in the experiments of the inventor (acoustic transducer with F/1 in water), L was approximately 2, similar to the phenomenological constant K.

Again, the acoustic power may depend solely on the variance along the v direction and a phenomenological constant (L), apart from known variables of the experimental setup, i.e. the focal length f, the wavelength of the acoustic waves λ, the density ρo and refractive index $n_o$ of the test medium, and the phase velocity c in the test medium. In addition, the acoustic power depends on the distance a between the first order minima. This distance a can be experimentally selected with the aperture 22 using a Schlieren image of the ultrasonic focus 28 as a reference, wherein the first order minima may appear as first order zeros of the vertical light distribution in the image.

The distance a, through diffraction, deterministically depends on the properties of the ultrasonic emitter 12, such that a can also be expressed in terms of the acoustic focal length F along x $$a = 2.44\frac{\lambda F}{d} \tag{29}$$

and such that the power according to Eq. (28) may be alternatively written as $$W = 1.49\cdot L\cdot \frac{\lambda^2 F^2 c^3 \rho_0}{(n_0-1)^2 d^2 f^2}\cdot\langle v^2\rangle \tag{30}$$

To experimentally access the acoustic power W, preferably a rectangular adjustable aperture 22 is used to limit the cross section of the collimated beam of light 20 to a pre-determined height a, and to select a width along the propagation direction of the acoustic waves corresponding predetermined (e.g. integer) number of extrema of the acoustic wave, such as a plurality of wavelengths of the acoustic wave.

Figure 5A:
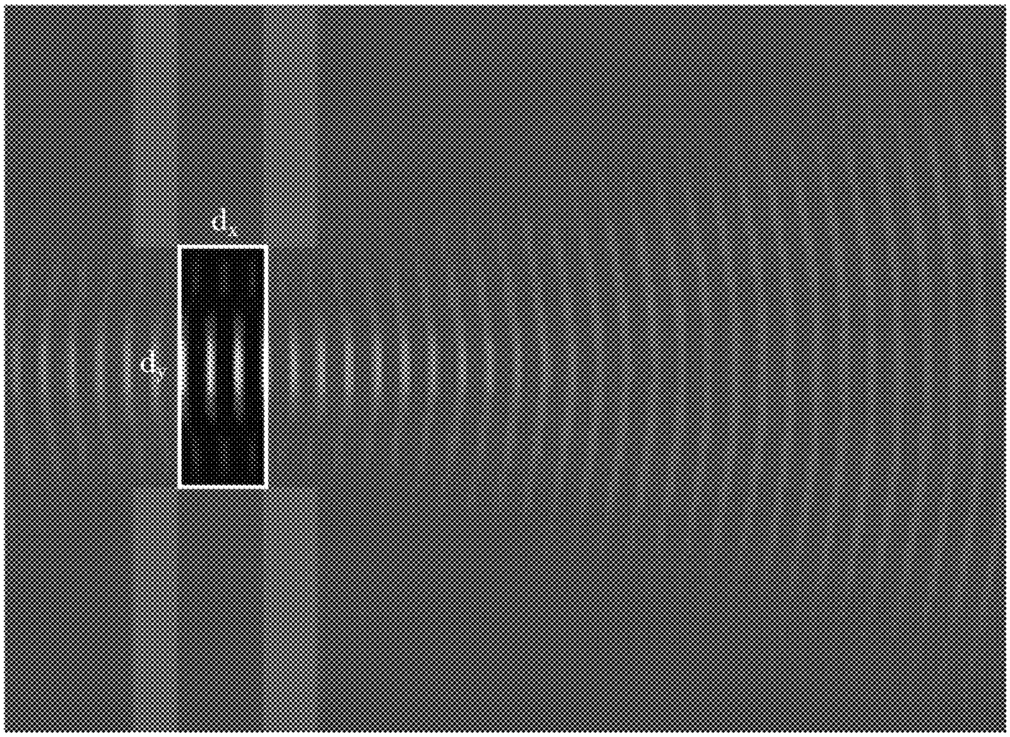
FIG. 5A, 5B illustrate the effect of the aperture on the selection of the probe portion in a Schlieren visualization of the acoustic field.
Figure 5B:
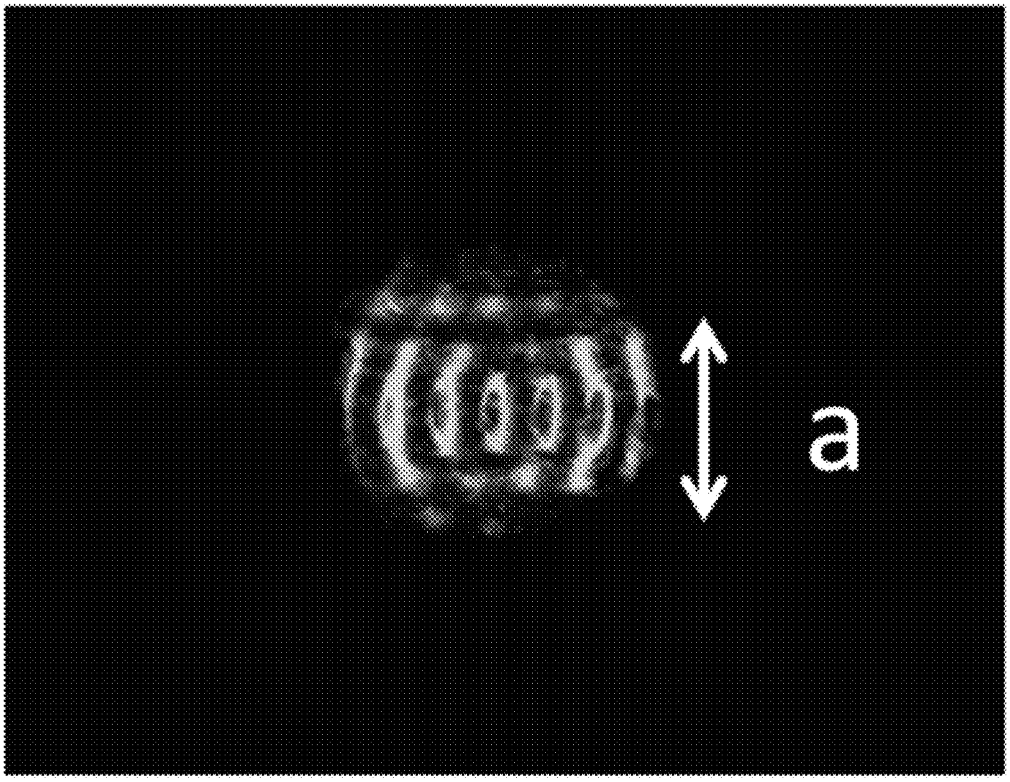

FIG. 5A illustrates the effect of the aperture 22 in the system 10 of FIG. 1 according to a simulation of a stroboscopic Schlieren image of the acoustic waves in the test medium. FIG. 5B illustrates a Schlieren image taken of an ultrasonic focus 28, wherein a circular aperture 22 is used to selectively irradiate the ultrasonic focus 28.

The Schlieren image visualizes the spatial profile of the deflection experienced by a collimated beam of light 19, 20 due to the refractive index modulation by the acoustic wave. A bright portion may visualize a spatial region associated with a pressure gradient, which deflects the collimated beam of light 19, 20, whereas a dark portion of the image may be associated with spatial regions causing negligible deflection of the collimated beam of light 19, 20. For example, spatial regions not subject to acoustic waves or spatial regions of the acoustic field in which the refractive index does not change (e.g. nodes of the acoustic wave) may cause negligible deflection of the collimated beam of light 19, 20 and may appear as dark regions in the Schlieren image.

In FIG. 5A, the window defined by the dimensions of the aperture 22 $d_x$, $d_y$, selects a portion close to the ultrasonic focus 28 of the ultrasonic emitter 12. Preferably, the distance $d_y$ is set to correspond to the distance a between the first order minima of the ultrasonic focus 28, which can be experimentally determined directly from the Schlieren image as the distance between horizontally extending black regions (e.g. first order zeros of the image along y) indicating the first order minima, as seen in FIG. 5B (white arrow).

Preferably, the width $d_x$ of the aperture 22 (aligned with the propagation direction of the acoustic waves) is selected to conform to any suitable integer number of wavelengths, e.g. according to $d_x$=N*λ, with N being an integer number and A being the wavelength of the acoustic waves. For example, the width $d_x$ of the aperture 22 may be adjusted to selectively irradiate 1, 3, 5, 10, 20 or 100 wavelengths depending on the profile of the acoustic field under investigation. For an ultrasonic focus 28, the distance $d_x$ is preferably set to correspond to an integer number of wavelengths within a substantially cylindrical portion of the acoustic field around the ultrasonic focus 28, such as 5 wavelengths.

In principle any non-integer width may be selected. However, the phenomenological constants K/L may then need to be adapted to the width for accurate determination of the acoustic power not corresponding to an integer number of extrema. Similarly, a different height $d_y$ may be selected as the expected error is small (the majority of the intensity will be measured in the window given by a) and as a correction factor for the acoustic power W may be a deterministic function of the ratio between $d_y$ and a.

Figure 6A:
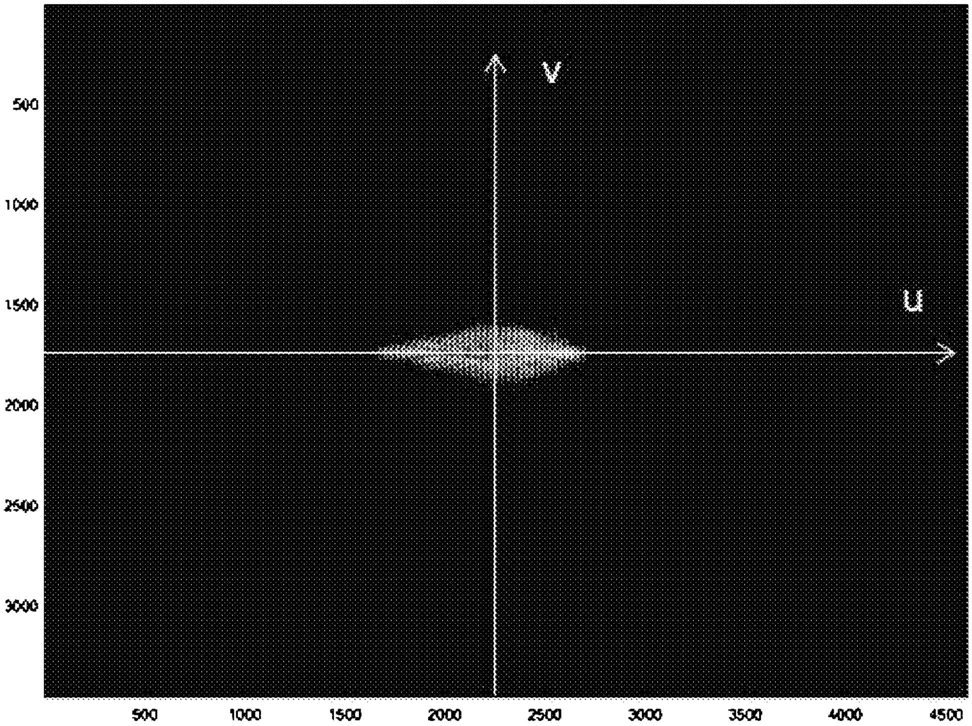
FIG. 6A, 6B illustrate examples of digitized images of the light intensity distribution in the focal plane resulting from a selectively irradiated ultrasonic focus for two different acoustic powers.
Figure 6B:
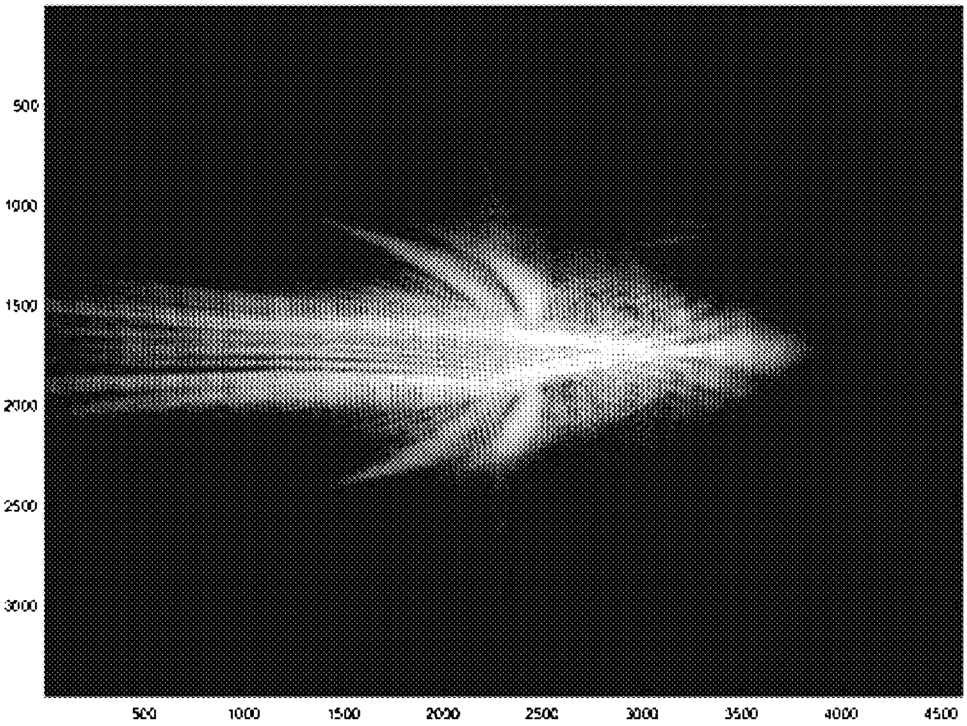

FIG. 6A, 6B illustrate examples of digitized images of the light intensity distribution in the focal plane 32 for two different acoustic powers in an ultrasonic focus 28 of an ultrasonic emitter with a frequency of 1.7 MHz selectively irradiated with a collimated laser beam, which is partially blocked with a rectangular aperture 22. The coordinate system along the u- and v-direction, corresponding to the x- and y-directions of FIG. 1 is overlaid in white.

In FIG. 6A, the acoustic power of the ultrasonic emitter 12 is comparatively low at an acoustic power of 20 W, such that in the ultrasonic focus 28, the acoustic waves are substantially harmonic. The light intensity distribution features a substantially symmetric, elliptic shape which is modulated along the "u"-direction with a stripe pattern. The stripe pattern modulating the light intensity distribution may be considered as a diffraction pattern emerging from a periodicity of the pressure field along the propagation direction of the acoustic waves and a variable phase change of the deflected beam of light 46 passing the ultrasonic focus 28.

As illustrated in FIG. 6A, the spatial extent of the light intensity distribution may be larger along the u-direction than along the v-direction, as the pressure gradient caused by adjacent peaks and troughs of the acoustic wave may generally be larger than a pressure gradient caused by the spatial profile of the ultrasonic focus 28 along the y-direction.

In FIG. 6B the acoustic power of the ultrasonic emitter 12 is comparatively high at an acoustic power of 210 W, such that in the ultrasonic focus 28, the acoustic waves may deviate from a substantially harmonic profile, and/or such that shock waves may develop close to the ultrasonic focus 28. As a result, the light intensity distribution in FIG. 6B deviates from a substantially elliptic profile and is non-symmetric with respect to the vertical direction.

Figure 7:
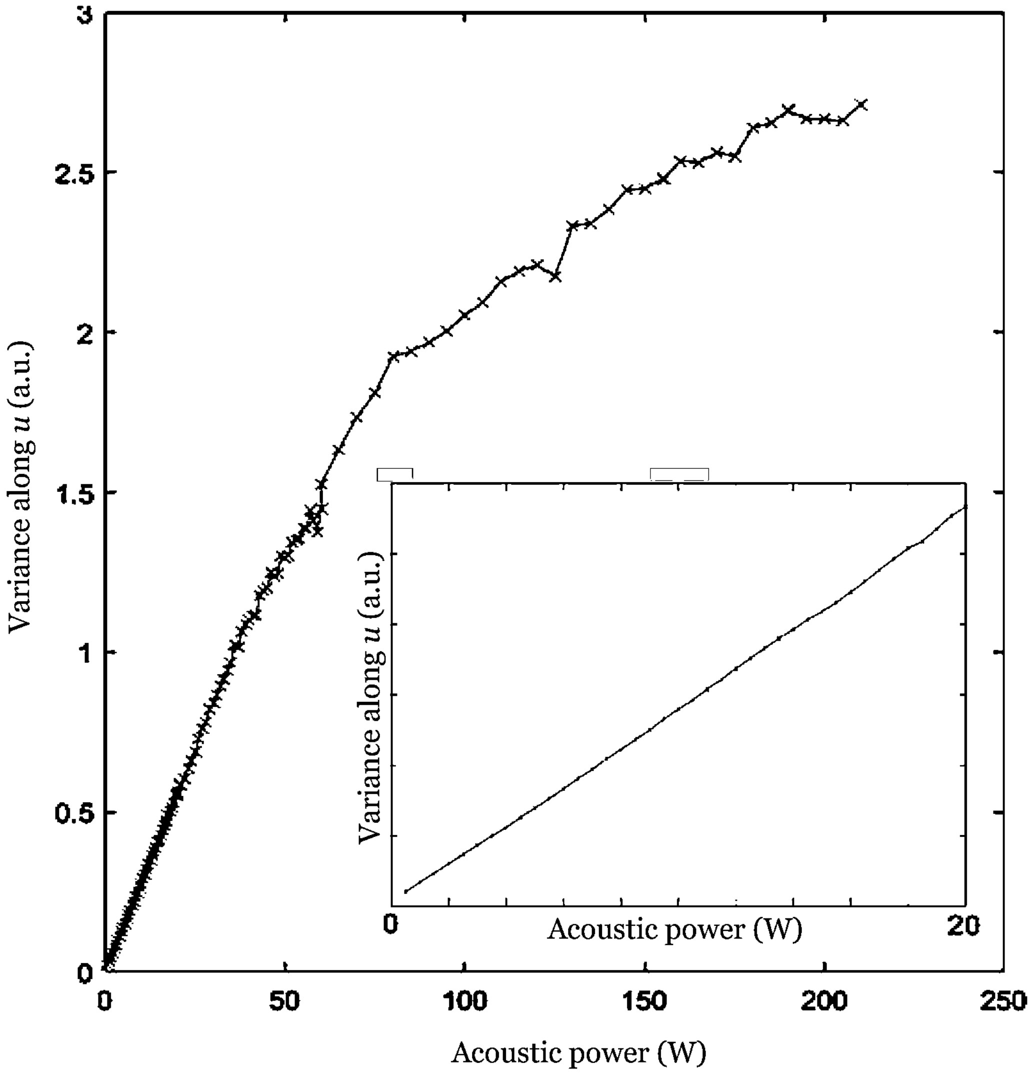
FIG. 7 illustrates a graph of the variance $\langle u^2 \rangle$ of the light intensity distribution along the u-direction as a function of the acoustic power as determined with the method according to FIG. 2.

FIG. 7 illustrates a graph of the variance $\langle u^2 \rangle$ of the light intensity distribution along the u-direction as a function of the acoustic power of an ultrasonic emitter 12 coupled to a test medium, as determined from digitized images of the focal plane 32, similar to FIGS. 6A, 6B.

Each point in the graph corresponds to the analysis result of one digitized image of the focal plane 32 obtained for a selected acoustic power of the ultrasonic emitter 12 with a system 10 comparable to the one shown in FIG. 1. The acoustic power of the ultrasonic emitter 12 was progressively adjusted to obtain a series of images for different acoustic powers which were subsequently analyzed to determine the variance $\langle u^2 \rangle$ according to Eq. (16) in a coordinate system centered on the focal point of the focusing lens 30 for all pixels i in the digitized image. The inset illustrates a zoomed view of the graph up to acoustic powers of 20 W. The u-direction corresponds to the propagation direction of the acoustic waves (along the x-direction).

The graph shows a substantially linear relationship between the variance $\langle u^2 \rangle$ of the light intensity distribution in the focal plane 32 along the u-direction and the acoustic power up to acoustic powers of about 50 W. For acoustic powers above 50 W, the relationship between the acoustic power and the variance $\langle u^2 \rangle$ of the light intensity distribution in the focal plane 32 along the u-direction deviates from a linear relationship. The deviation from a linear relationship may be correlated with the emergence of a deviation from a harmonic wave profile in the ultrasonic focus 28 due to nonlinearities. The fluctuation of the variance $\langle u^2 \rangle$ at higher acoustic powers may be attributed to the emergence of cavitation in the test medium.

Figure 8:
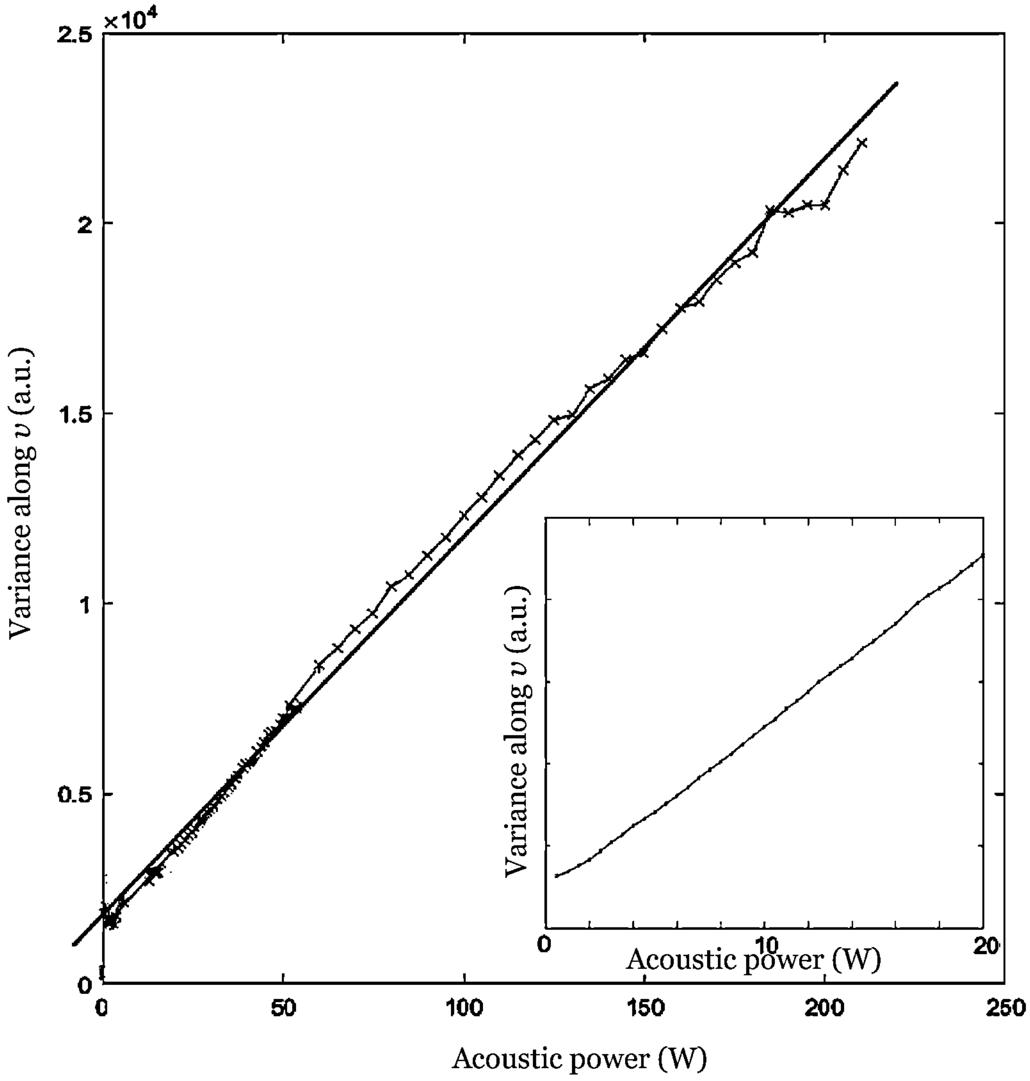
FIG. 8 illustrates a graph of the variance $\langle v^2 \rangle$ of the light intensity distribution along the v-direction as a function of the acoustic power as determined with the method according to FIG. 2.

FIG. 8 illustrates a graph of the variance along the v-direction as determined from digitized images of the focal plane 32 obtained with the same experimental procedure as in FIG. 7, but wherein the variance $\langle v^2 \rangle$ was determined according to Eq. (27). The solid black line represents a fit of the experimental data. The inset illustrates a zoomed view of the graph up to acoustic powers of 20 W.

As opposed to the graph in FIG. 7, the relationship between the acoustic power and the variance of the intensity of along the v-direction remains substantially linear up to acoustic powers of 200 W.

The different dependency of the variance along the spatial directions u/v on the acoustic power may be understood based on the observation that the shape of the pressure profile of the ultrasonic focus along the y-direction may be dominated by diffraction and may therefore only negligibly be affected by an emerging non-harmonicity of the acoustic wave.

FIGS. 7 and 8 demonstrate that the method may be used to quantitatively assess the acoustic power of an ultrasonic emitter 12 based on the refraction-induced width of the light intensity distribution in the focal plane 32.

For comparatively small acoustic powers, i.e. acoustic powers for which the acoustic waves may be assumed to be substantially harmonic, the variance $\langle u^2 \rangle$ along the u-direction may be an accurate quantitative measure of the acoustic power, due to the generally larger deflection of light along the u-direction. As an example, the variance $\langle u^2 \rangle$ along the u-direction may be used to quantitatively assess the acoustic power in a portion of a plane travelling/standing acoustic wave, or in the ultrasonic focus 28 for comparatively low acoustic powers.

For comparatively high acoustic powers, e.g. in the ultrasonic focus 28 at an ultrasonic power of 100 W, for which the assumption of a harmonic wave may not be accurate, the variance $\langle v^2 \rangle$ along the v-direction may be used to quantitatively assess the acoustic power.

Accordingly, by determining a refraction-induced "width" or "spread" along the v-direction, the method may also be used to probe the acoustic power of an ultrasonic emitter 12 generating shock waves in the ultrasonic focus 28, e.g. for quality control in extracorporeal shockwave therapy.

The skilled person will appreciate that the analysis of both the variance along the u- and v-direction may be combined in some embodiments to accurately and robustly determine the acoustic power of the acoustic imager 12.

As a further example, a skilled person will appreciate, that the variance along the u- and v-direction could be evaluated over part of Fourier plane 32, e.g. a half plane or a quarter plane with respect to the origin of the coordinate plane. This can be advantageous should the available sensor array 34 be too small to record the full Fourier image, e.g. in the focal plane 32.

As a further example, the skilled person will appreciate, that by covering part of the CMOS or CCD sensor array 34 or an intermediate Fourier plane (e.g. the focal plane 32 of the focusing lens 30) with a light absorbing sheet, a partial aperture for the light can be created. The cover may be oriented horizontally or vertically to block a half plane in a way, that intensity at the origin is cut off by a small overlap. This could be advantageous, if the intensity of the origin leads to sensor over-saturation. Evaluation of the variance may then be performed for the light intensity of the remaining half or quarter plane. A similar procedure may be used for restricting light on the Fourier plane to quadrants of the plane in a number of combinations (not shown).

The skilled person will appreciate that the modulation pattern caused by the periodicity of the acoustic field may be effectively disregarded in the analysis, e.g. when the variance is used as a measure of the refraction-induced width of the light intensity distribution in the focal plane 32. Accordingly, the light source 14 may also be incoherent in some embodiments.

Moreover, it is noted that the images in FIGS. 5B-6B were obtained by stroboscopically probing the focal plane 32, i.e. the light source 14 was triggered to emit pulses of light at a frequency which corresponds to the frequency of the ultrasonic emitter 12. However, the skilled person will appreciate that the focal plane 32 may be imaged with a continuous light source 14 without affecting the determination of the acoustic power of the ultrasonic emitter 12 based on the variance of the light intensity distribution along the u/v-direction.

As a further note, in FIG. 8, the straight fit of the experimentally determined variance along the v-direction as a function of the acoustic power does not intersect the origin of the graph. The skilled person will however appreciate that the relationship between the variance $\langle v^2 \rangle$ (or $\langle u^2 \rangle$) and the acoustic power may be numerically corrected or the digitized light intensity distribution may be appropriately filtered, e.g. in order to correct for background noise, prior to the analysis of $\langle u^2 \rangle / \langle v^2 \rangle$.

Figure 9:
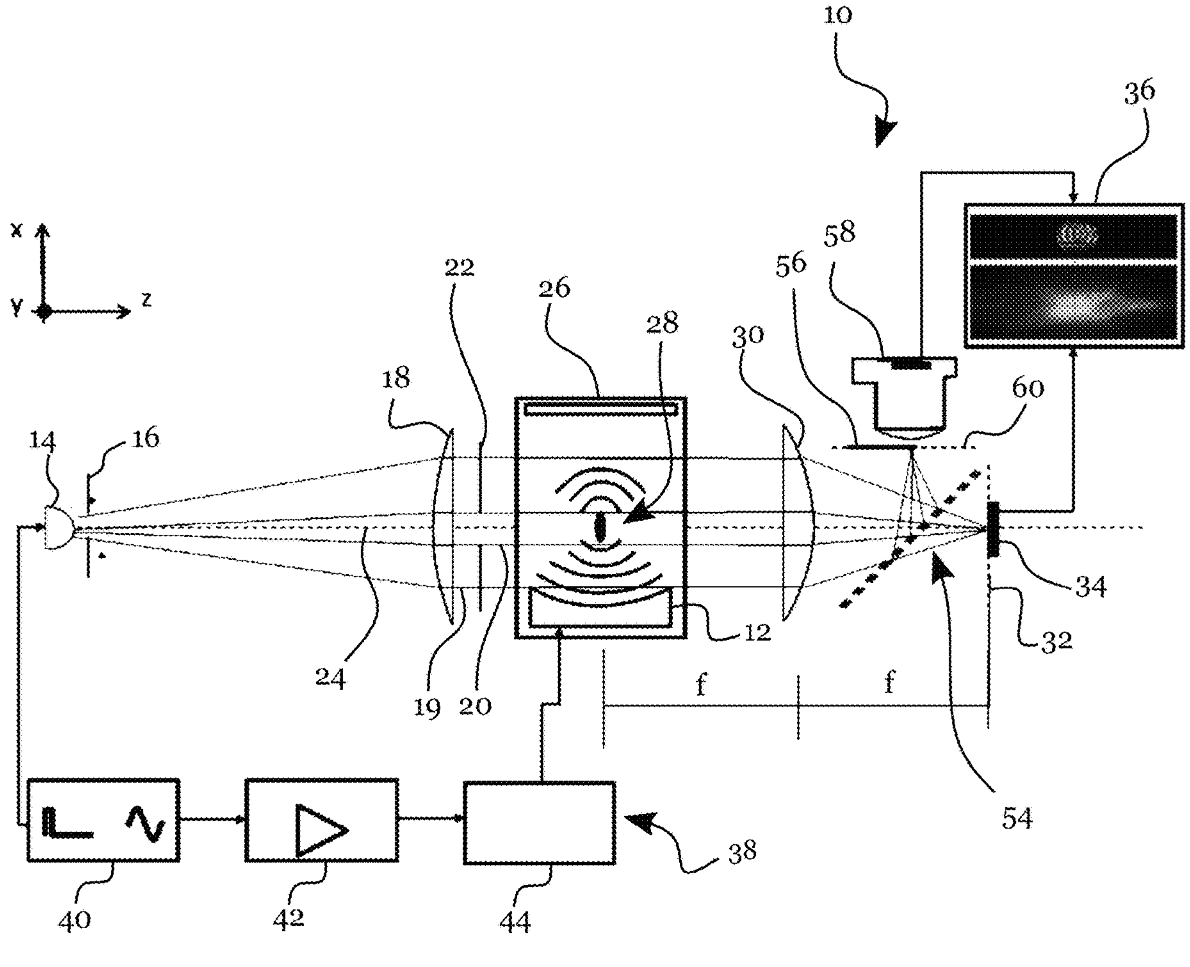
FIG. 9 illustrates a system for calibrating an acoustic power of an ultrasonic emitter according to another example.

FIG. 9 illustrates a system 10 for calibrating an acoustic power of an ultrasonic emitter 12 according to another example. In addition to the elements of the system 10 illustrated in FIG. 1, the system 10 illustrated in FIG. 9 comprises a beam splitter 54, a knife edge 56 and a camera 58. The beam splitter 54 is arranged in an optical path between the focusing lens 30 and the two-dimensional image sensor array 34 imaging the focal plane 32. The beam splitter 54 creates a second optical beam associated with a second focal plane 60 (as in the example of FIG. 9, or alternatively a second image of the focal plane 32).

The knife edge 56 is arranged in the second focal plane 62 spatially filter a focal point of the focusing lens 30 in the second focal plane 60. The camera 58 is arranged behind the knife edge 56 along the optical path of the second optical beam and can be configured to image probe portion of the test medium. The knife edge 56 blocks light which is only been negligibly been deflected by a varying refractive index profile in the test medium, such that the camera 58 may be used to obtain a Schlieren image of the acoustic pressure field. The skilled person will appreciate that other spatial filter profiles may equally be used, e.g. a point-shaped absorber centered on the focal point in the second focal plane 60, or that a reconfigurable spatial filter (not shown) may be arranged in the focal plane 32 or an image thereof. For example, the reconfigurable spatial filter which may be selectively reconfigured between a first configuration, in which the focal point is spatially filtered to obtain a Schlieren image, and a second configuration for quantitatively assessing the acoustic power of the ultrasonic emitter 12 based on the light intensity distribution in the focal plane 32. Additionally or alternatively, the variance may also be determined for an image of a partially occluded focal plane 32, which may be partially occluded by a knife edge 56, for determining the acoustic power of the ultrasonic emitter 12, e.g. by determining the variance for a non-blocked portion of the focal plane 32, such as a half plane of the focal plane 32.

The images taken by the camera 58 may be displayed on the computer screen 36, such as to adjust a position and configuration of the adjustable aperture 22 based on a visualization of the selectively irradiated portion of the acoustic waves, e.g. in order to selectively irradiate a well-defined probe portion of the test medium with the collimated beam of light 20. Using the beam splitter 56 may therefore facilitate a calibration of the system 10 e.g. to different ultrasonic emitters 12 without introducing additional moving parts in the optical path.

It is noted that the foregoing description was discussed for the purpose of illustration and should not be construed as limiting. The skilled person will in particular appreciate that the spread of the light intensity distribution may be expressed through other mathematical expressions and may further be quantitatively assessed with other metrics which may be proportional to the variance of the light intensity distribution.

Further, while the power has been derived for a spherical ultrasonic focus 28, the method may be applied to various ultrasonic emitter geometries, such as spherical or rectangular ultrasonic emitters 12 constituted of an array of emitters that are phase controlled to induce an acoustic field of a specific geometry, or to plane wave emitters, etc.

The method may be applied as part of a quality control system 10, wherein the ultrasonic emitter 12 may be placed into a holder at a predetermined position and the method may be performed without any calibration of the experimental setup. For example, the system 10 may automatically determine whether the variance of the light intensity distribution in a focal plane 32 matches a target value, or is within a tolerance interval around a target value for a set acoustic power.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS

10 system
12 ultrasonic emitter
14 light source
16 pinhole
18 collimation lens
19 collimated beam of light in front of aperture
20 transmitted portion of collimated beam of light
22 aperture
24 beam direction
26 container
28 ultrasonic focus
30 focusing lens
32 focal plane
34 two-dimensional image sensor array
36 computer screen
38 control system
40 signal generator
42 amplifier
44 impedance matching circuit
46 deflected-beam of light
48 first deflected beam of light
50 second deflected beam of light
52 harmonic acoustic wave
54 beam splitter
56 knife edge
58 camera
60 second focal plane

What is claimed is:

1. A method for determining an acoustic power of an ultrasonic emitter, the method comprising:

coupling the ultrasonic emitter to a test medium;

driving the ultrasonic emitter to induce acoustic waves in the test medium along an acoustic wave propagation direction, the acoustic waves causing a change of the refractive index of the test medium;

selectively irradiating a probe portion of the test medium with a collimated beam of light along a beam direction which is different from the acoustic wave propagation direction, such that the collimated beam of light intersects the acoustic waves;

passing the collimated beam of light through an optical element or optical assembly configured for focusing the collimated beam in a focal plane; and determining the acoustic power of the ultrasonic emitter based on a refraction-induced width of a light intensity distribution in the focal plane, wherein determining the refraction-induced width of the light intensity distribution comprises determining a deviation metric based on a value of a select coordinate of a two-dimensional coordinate system of an image of the focal plane.

2. The method of claim 1, wherein the probe portion is selectively irradiated, such that the acoustic waves overlap the entire cross section of the collimated beam of light when viewed along the beam direction of the collimated beam of light.

3. The method of claim 1, wherein selectively irradiating the probe portion of the test medium comprises blocking portions of the collimated beam.

4. The method of claim 1, wherein the collimated beam selectively irradiates a predetermined number of extrema of acoustic waves generated by the ultrasonic emitter in the probe portion of the test medium.

5. The method of claim 1, wherein the acoustic power is determined based on a spatial variance of the light intensity distribution in the focal plane with respect to one or both of a center of the light intensity distribution and the focal point in said focal plane in absence of the acoustic waves.

6. The method of claim 5, wherein the center of the focal plane is determined by imaging the focal plane with the ultrasonic emitter turned off and determining the weighted average of the light intensity in a resulting image of the focal plane in absence of ultrasonic waves.

7. The method of claim 5, wherein the center of the focal plane is determined based on the weighted average of the light intensity in the focal plane.

8. The method of claim 1, wherein determining the deviation metric is mathematically equivalent to summing, for a plurality of points of the image of the focal plane, a product of a normalized light intensity value and a squared value of the select coordinate.

9. The method of claim 1, wherein the test medium is a liquid and the method comprises mounting the ultrasonic emitter in a container of the test medium for coupling the ultrasonic emitter to the test medium.

10. The method of claim 1, wherein the acoustic power is determined in an ultrasonic focus of the ultrasonic emitter, and the method comprises inducing the ultrasonic focus in the test medium and selectively irradiating the ultrasonic focus with the collimated beam of light.

11. A system for determining an acoustic power of an ultrasonic emitter comprising an interface configured to couple the ultrasonic emitter to a test medium;

an aperture configured to select a portion of a collimated beam of light to irradiate a probe portion of said test medium, in which acoustic waves generated by the ultrasonic emitter are present, with a collimated beam of light;

an optical element or optical assembly configured to focus the collimated beam onto a focal plane in the absence of acoustic waves;

an imaging assembly configured to obtain an image of the focal plane;

a processing system configured to determine the acoustic power of the ultrasonic emitter based on a refraction-induced width of the light intensity distribution in the image of the focal plane, wherein the processing system is configured to determine the refraction-induced width of the light intensity distribution by determining a deviation metric based on a value of a select coordinate of a two-dimensional coordinate system of an image of the focal plane, wherein the processing system is configured to determine the refraction-induced width of the light intensity distribution by determining a deviation metric based on a value of a select coordinate of a two-dimensional coordinate system of an image of the focal plane.

12. The system of claim 11, wherein the imaging assembly comprises a two-dimensional image sensor array for obtaining the image of the focal plane.

13. The system of claim 11, wherein a coordinate axis corresponding to the select coordinate is aligned with the propagation direction of acoustic waves emitted by the ultrasonic emitter or substantially perpendicular to the acoustic wave propagation direction.

14. The system of claim 13, wherein determining the deviation metric is mathematically equivalent to summing, for a plurality of points of the image of the focal plane, a product of a normalized light intensity value and a squared value of the select coordinate according to $$\frac{\sum_i I_i * (w_i - w_0)^2}{\sum_i I_i}$$

wherein Ii is the intensity of the light in a point i of the image, w_i is the value of the select coordinate, and w_0 is the corresponding value for the center of the focal plane.

15. The system of claim 11, wherein the aperture is adjustable and rectangular, wherein two dimensions of the rectangular aperture are individually adjustable.

16. The system of claim 11, wherein the acoustic power is determined in an ultrasonic focus of the ultrasonic emitter, and the system is configured to selectively irradiate the ultrasonic focus with the collimated beam of light between first or second order minima of the ultrasonic focus.

17. The system of claim 11, wherein the test medium is a transparent liquid the system comprises a transparent container for the test medium and the interface is adapted to couple the ultrasonic emitter to the test medium in the container.

18. The system of claim 11, further comprising a point-like light source and a collimation lens configured to create the collimated beam of light.

19. The system of claim 11, further comprising a holder configured to hold the ultrasonic emitter at a position such that a distance between the probe portion and the optical element or optical assembly along a beam direction of the collimated beam of light corresponds to a focus length of the optical element or optical assembly.

* * * * *